(12) United States Patent
Huang et al.

(10) Patent No.: US 10,554,764 B2
(45) Date of Patent: Feb. 4, 2020

(54) METHOD, DEVICE AND SYSTEM FOR CARRYING OUT SERVICE IN NETWORK

(71) Applicant: Huawei Technologies Co., Ltd., Shenzhen (CN)

(72) Inventors: Yong Huang, Shenzhen (CN); Hengjun Zhu, Shenzhen (CN); Lehong Niu, Shenzhen (CN); Xiaoyu Gong, Shenzhen (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1094 days.

(21) Appl. No.: 14/920,599

(22) Filed: Oct. 22, 2015

(65) Prior Publication Data

US 2016/0044118 A1 Feb. 11, 2016

Related U.S. Application Data

(63) Continuation of application No. PCT/CN2014/075877, filed on Apr. 22, 2014.

(30) Foreign Application Priority Data

Apr. 23, 2013 (CN) .......................... 2013 1 0143348

(51) Int. Cl.
*H04L 29/08* (2006.01)
*H04L 12/24* (2006.01)
(Continued)

(52) U.S. Cl.
CPC ............. *H04L 67/16* (2013.01); *G06Q 10/00* (2013.01); *H04L 41/5041* (2013.01);
(Continued)

(58) Field of Classification Search
CPC . H04L 67/16; H04L 67/2814; H04L 41/5041; H04L 47/2425; H04L 47/2441; H04L 47/803; H04L 65/4084; G06Q 10/00
See application file for complete search history.

(56) References Cited

U.S. PATENT DOCUMENTS

2009/0129271 A1* 5/2009 Ramankutty ........... H04L 12/66
370/235
2010/0260178 A1* 10/2010 Huang .................... H04L 12/18
370/390
(Continued)

FOREIGN PATENT DOCUMENTS

CN 102440028 A 5/2012
CN 102970751 A 3/2013
(Continued)

OTHER PUBLICATIONS

"Content Delivery Network (CDN) protocols," Draft ETSI TS 183 073, V0.1.2, pp. 1-28, European Telecommunications Standards Institute, Sophia-Antipolis, France (Mar. 2013).
(Continued)

*Primary Examiner* — Azizul Choudhury
(74) *Attorney, Agent, or Firm* — Leydig, Voit & Mayer, Ltd.

(57) ABSTRACT

Embodiments of the present invention provide a method, device and system for carrying out a service in a network. The control apparatus comprises: an orchestrator unit, configured to receive a service request for requesting to carry out a service, wherein the service request comprises service deployment information for requesting to deploy a first service, service flow identification information for identifying a first packet flow and service flow steering information; and a control unit, configured to send the service deployment information to a computing apparatus, and send the service flow identification information and the service flow steering (Continued)

information to an identifying and steering apparatus. Technical solutions of the present invention provide a new service mode, which can meet developing needs of OTT applications.

34 Claims, 7 Drawing Sheets

(51) Int. Cl.
  *G06Q 10/00* (2012.01)
  *H04L 12/851* (2013.01)
  *H04L 12/927* (2013.01)
  *H04L 29/06* (2006.01)

(52) U.S. Cl.
  CPC ...... *H04L 47/2425* (2013.01); *H04L 47/2441* (2013.01); *H04L 47/803* (2013.01); *H04L 65/4084* (2013.01); *H04L 67/2814* (2013.01)

(56) References Cited

U.S. PATENT DOCUMENTS

| | | |
|---|---|---|
| 2011/0280143 A1 | 11/2011 | Li et al. |
| 2013/0036177 A1 | 2/2013 | Leeder et al. |
| 2014/0010085 A1* | 1/2014 | Kavunder ......... H04W 28/0215 370/235 |

FOREIGN PATENT DOCUMENTS

| | | |
|---|---|---|
| CN | 103269280 A | 8/2013 |
| WO | WO 2012167106 A1 | 12/2012 |

OTHER PUBLICATIONS

"Further consideration on ACK/NACK multiplexing in TDD," 3GPP TSG RAN WG1 Meeting #54bis, Prague, Czech Republic, R1-083560, 3rd Generation Partnership Project, Valbonne, France (Sep. 29-Oct. 3, 2008).

* cited by examiner

METHOD, DEVICE AND SYSTEM FOR CARRYING OUT SERVICE IN NETWORK

CROSS-REFERENCE TO RELATED APPLICATIONS

This application is a continuation of International Patent Application No. PCT/CN2014/075877, filed on Apr. 22, 2014, which claims priority to Chinese Patent Application No. 201310143348.1, filed on Apr. 23, 2013, both of which are hereby incorporated by reference in their entireties.

TECHNICAL FIELD

Embodiments of the present invention relate to communication technology, and more particularly, to a method, a device and a system for carrying out a service in a network.

BACKGROUND

An internet (Internet) application running on a network is typically referred to as an over the top (Over The Top, referred to as OTT) application. A large number of OTT applications are deployed in an internet data center (Internet Data Center, referred to as IDC shortly), and the IDC is located at a core layer of the network. A user terminal accessing an OTT application located in the IDC is a typical mode for a user to surf the internet. There may be a client end software of the OTT application installed at the user terminal, but due to limited network conditions, when a large number of user terminals access the OTT application, stagnation and wait condition would happen regardless of whether the user terminal accesses the OTT application via either a browser or an OTT client, which influence user experience.

Based on the above problems, some relatively large OTT applications may use a service mode of a content delivery network (Content Delivery Network, referred to as CDN shortly), namely, when a user accesses a central OTT application, the access thereof will be redirected to a distributed OTT application close to the user, in this way, bandwidth pressure of the central OTT application may be alleviated, and bad experience, such as stagnation and wait and the like, may be relieved to a certain extent. However, with the rapid development of the internet at present, this service mode still cannot meet rapid development needs of the OTT application. Therefore, it is in urgent need of a new service mode supporting the OTT application, so as for meeting needs of OTT applications that start to develop.

SUMMARY

Embodiments of the present invention provide a method, a device and a system for carrying out a service in a network, so as for providing a new service mode to meet developing needs of OTT applications.

In a first aspect, a control apparatus is provided, including:

an orchestrator unit, configured to receive a service request for requesting to carry out a service, wherein the service request includes service deployment information for requesting to deploy a first service, service flow identification information for identifying a first packet flow and service flow steering information; and a control unit, configured to send the service deployment information to a computing apparatus, and send the service flow identification information and the service flow steering information to an identifying and steering apparatus.

In combination with the first aspect, in a first possible implementation manner of the first aspect, the control unit is further configured to send a service chain identifier to the identifying and steering apparatus.

In combination with the first aspect or the first possible implementation manner of the first aspect, in a second possible implementation manner of the first aspect, the control unit is specifically configured to send a load command message to the computing apparatus and send a flow control message to the identifying and steering apparatus, wherein the load command message includes the service deployment information, and the flow control message includes the service flow identification information and the service flow steering information.

In combination with the first aspect or the first possible implementation manner of the first aspect or the second possible implementation manner of the first aspect, in a third possible implementation manner of the first aspect, the control unit is further configured to send a resource adjustment message to the computing apparatus, wherein the resource adjustment message includes information of resource needing to be occupied currently by an operation file necessary for deploying the first service.

In combination with the second possible implementation manner of the first aspect or the third possible implementation manner of the first aspect, in a fourth possible implementation manner of the first aspect, the control unit includes a first control module and a second control module;

the orchestrator unit is further configured to send a first control message to the first control module and send a second control message to the second control module, the first control message including the service flow identification information and the service flow steering information, and the second control message including the service deployment information;

the first control module is configured to send the flow control message to the identifying and steering apparatus according to the first control message; and the second control module is configured to send the load command message to the computing apparatus according to the second control message.

In combination with the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the service flow steering information includes at least one of the following:

an internet protocol (IP) address of the computing apparatus, port information of the computing apparatus, and identification information of an operation file necessary for deploying the first service.

In combination with the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the service deployment information includes address information of an operation file necessary for deploying the first service.

In combination with the sixth possible implementation manner of the first aspect, in a seventh possible implementation manner of the first aspect, the address information of the operation file includes: path information for accessing the operation file and filename information of the operation file, or uniform resource locator (URL) information directing to the operation file.

In combination with the first aspect or the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect, or the seventh possible implementation manner of the first aspect, in an eighth possible implementation manner of the first aspect, the service flow identification information includes at least one of the following:

information on a physical port receiving the first packet flow, information on a logical port receiving the first packet flow, URL information accessed by the first packet flow, and information on a source IP address, a target IP address, a source transmission layer port and a target transmission layer port of the first packet flow.

In a second aspect, a computing apparatus is provided, including:

a first receiving unit, configured to receive service deployment information that is sent by a control apparatus and used for requesting to deploy a first service;

a deploying unit, configured to operate, according to the service deployment information, an operation file necessary for deploying the first service, so as to deploy the first service;

a second receiving unit, configured to receive a first packet flow sent by an identifying and steering apparatus, wherein the first packet flow includes a service chain identifier;

a service determining unit, configured to determine, according to the service chain identifier, multiple service processings that belong to the first service and need to be performed on the first packet flow and a sequence of performing the multiple service processings; and a processing unit, configured to perform the multiple service processings on the first packet flow according to the sequence.

In combination with the second aspect, in a first possible implementation manner of the second aspect, the deploying unit is specifically configured to load and operate, according to the service deployment information, multiple service components for deploying the first service, so as to deploy the first service;

the service determining unit is specifically configured to inquire a service routing table according to the service chain identifier to determine multiple service processing components from the multiple service components and a utilization sequence of the multiple service processing components, wherein the multiple service processing components are service components in the multiple service components that are used for implementing the multiple service processings; and the processing unit is specifically configured to utilize the multiple service processing components to process the first packet flow according to the utilization sequence of the multiple service processing components.

In combination with the first possible implementation manner of the second aspect, in a second possible implementation manner of the second aspect, the service determining unit being configured to inquire the service routing table according to the service chain identifier to determine multiple service processing components from the multiple service components and the utilization sequence of the multiple service processing components, includes:

inquiring, according to the service chain identifier and a first ingress port, a first service routing table entry to determine an egress port reaching a first service processing component, wherein the first ingress port is an ingress port receiving the first packet flow, and the first service processing component is used for performing first service processing in the multiple service processings;

steering the first packet flow to the first service processing component;

receiving the first packet flow subjected to the first service processing;

inquiring a second service routing table entry according to a second ingress port to determine an egress port reaching a second service processing component, wherein the second ingress port is an ingress port receiving the first packet flow subjected to the first service processing, and the second service processing component is used for performing second service processing in the multiple service processings; and steering the first packet flow subjected to the first service processing to the second service processing component.

In combination with the second possible implementation manner of the second aspect, in a third possible implementation manner of the second aspect, the service determining unit being configured to inquire the second routing table entry according to the second ingress port to determine the egress port reaching the second service processing component, includes:

inquiring, according to the service chain identifier and the second ingress port, the second service routing table entry to determine the egress port reaching the second service component.

In combination with the second aspect or the first possible implementation manner of the second aspect or the second possible implementation manner of the second aspect or the third possible implementation manner of the second aspect, in a fourth possible implementation manner of the second aspect, the first receiving unit is further configured to receive a resource adjustment message sent by the control apparatus, wherein the resource adjustment message includes information of resource needing to be occupied currently by the operation file; and the deploying unit is further configured to adjust resource occupied by the operation file according to the resource adjustment message.

In combination with the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the service deployment information includes address information of the operation file.

In combination with the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner of the second aspect, the computing apparatus is a server device; and the service determining unit is implemented in a virtual switch Vswitch of the server device.

In the third aspect, an identifying and steering apparatus is provided, including:

a receiving unit, configured to receive service flow identification information for identifying a first packet flow and service flow steering information sent by a control apparatus;

an identifying unit, configured to identify the first packet flow from received packet flow according to the service flow identification information;

a configuring unit, configured to add a service chain identifier to the first packet flow; and a steering unit, configured to steer the first packet flow carrying the service chain identifier to a computing apparatus according to the service flow steering information.

In combination with the third aspect, in a first possible implementation manner of the third aspect, the service flow steering information includes at least one of the following:

an internet protocol (IP) address of the computing apparatus, port information of the computing apparatus and identification information of an operation file necessary for deploying a first service.

In a fourth aspect, a system for carrying out a service in a network is provided, including any control apparatus provided by the first aspect, any computing apparatus provided by the second aspect and any identifying and steering apparatus provided by the third aspect.

In a fifth aspect, a system for carrying out a service in a network is provided, including any control apparatus provided by the first aspect, and further including an identifying and steering apparatus and a computing apparatus;

wherein the identifying and steering apparatus is configured to receive service flow identification information for identifying the first packet flow and service flow steering information sent by the control apparatus;

identify the first packet flow from received packet flow according to the service flow identification information; and steer the first packet flow to the computing apparatus according to the service flow steering information; and wherein the computing apparatus is configured to:

receive service deployment information that is sent by the control apparatus and used for requesting to deploy the first service;

operate, according to the service deployment information, an operation file necessary for deploying the first service, so as to deploy the first service;

receive the first packet flow sent by the identifying and steering apparatus; and perform processing of the first service on the first packet flow.

In a sixth aspect, a system for carrying out a service in a network is provided, including a control apparatus, a computing apparatus and an identifying apparatus; wherein the control apparatus is configured to receive a service request for requesting to carry out a service, the service request including service deployment information for requesting to deploy a first service and service flow identification information for identifying a first packet flow;

the identifying apparatus is configured to identify the first packet flow from received packet flow according to the service flow identification information; and the computing apparatus is configured to operate, according to the service deployment information, an operation file necessary for deploying the first service, so as to deploy the first service, and perform processing of the first service on the identified first packet flow after the first service is deployed.

In combination with the sixth aspect, in a first possible implementation manner of the sixth aspect, the identifying apparatus is further configured to add a service chain identifier to the first packet flow;

the computing apparatus is specifically configured to:

load and operate multiple service components for deploying the first service, so as to deploy the first service, determine, according to the service chain identifier, multiple service processings that belong to the first service and need to be performed on the first packet flow and a sequence of performing the multiple service processings, and perform the multiple service processings on the first packet flow according to the sequence.

In combination with the first possible implementation manner of the sixth aspect, in a second possible implementation manner of the sixth aspect, the determining, by the computing apparatus according to the service chain identifier, multiple service processings that belong to the first service and need to be performed on the first packet flow and a sequence of performing the multiple service processings, includes:

inquiring a service routing table according to the service chain identifier to determine multiple service processing components from the multiple service components and a utilization sequence of the multiple service processing components, wherein the multiple service processing components are service components in the multiple service components that are used for implementing the multiple service processings; and utilizing the multiple service processing components to process the first packet flow according to the utilization sequence of the multiple service processing components.

In a seventh aspect, a method for carrying out a service in a network is provided, including:

receiving a service request for requesting to carry out a service, wherein the service request includes service deployment information for requesting to deploy a first service, service flow identification information for identifying a first packet flow and service flow steering information; and sending the service deployment information to a computing apparatus, and sending the service flow identification information and the service flow steering information to an identifying and steering apparatus.

In combination with the seventh aspect, in a first possible implementation manner of the seventh aspect, the method further includes: sending a service chain identifier to the identifying and steering apparatus.

In combination with the seventh aspect or the first possible implementation manner of the seventh aspect, in a second possible implementation manner of the seventh aspect, the sending the service deployment information to a computing apparatus, and sending the service flow identification information and the service flow steering information to an identifying and steering apparatus, includes:

sending a load command message to the computing apparatus and sending a flow control message to the identifying and steering apparatus, wherein the load command message includes the service deployment information, and the flow control message includes the service flow identification information and the service flow steering information.

In combination with the seventh aspect or the first possible implementation manner of the seventh aspect or the second possible implementation manner of the seventh aspect, in a third possible implementation manner of the seventh aspect, the method further includes:

sending a resource adjustment message to the computing apparatus, wherein the resource adjustment message includes information of resource needing to be occupied currently by an operation file necessary for deploying the first service.

In combination with the seventh aspect or the first possible implementation manner of the seventh aspect or the second possible implementation manner of the seventh aspect or the third possible implementation manner of the seventh aspect, in a fourth possible implementation manner of the seventh aspect, the service flow steering information includes at least one of the following:

an internet protocol (IP) address of the computing apparatus, port information of the computing apparatus, and identification information of an operation file necessary for deploying the first service.

In combination with the seventh aspect or the first possible implementation manner of the seventh aspect or the second possible implementation manner of the seventh aspect or the third possible implementation manner of the seventh aspect or the fourth possible implementation manner of the seventh aspect, in a fifth possible implementation manner of the seventh aspect, the service deployment information includes address information of an operation file necessary for deploying the first service.

In combination with the fifth possible implementation manner of the seventh aspect, in a sixth possible implementation manner of the seventh aspect, the address information of the operation file includes: path information for accessing the operation file and filename information of the operation file, or uniform resource locator (URL) information directing to the operation file.

In combination with the seventh aspect or the first possible implementation manner of the seventh aspect or the second possible implementation manner of the seventh aspect or the third possible implementation manner of the seventh aspect or the fourth possible implementation manner of the seventh aspect or the fifth possible implementation manner of the seventh aspect or the sixth possible implementation manner of the seventh aspect, in a seventh possible implementation manner of the seventh aspect, the service flow identification information includes at least one of the following:

information on a physical port receiving the first packet flow, information on a logical port receiving the first packet flow, URL information accessed by the first packet flow, and information on a source IP address, a target IP address, a source transmission layer port and a target transmission layer port of the first packet flow.

In an eighth aspect, a method for carrying out a service in a network is provided, including:

receiving service deployment information for requesting to deploy a first service;

operating, according to the service deployment information, an operation file necessary for deploying the first service, so as to deploy the first service;

receiving a first packet flow, wherein the first packet flow includes a service chain identifier;

determining, according to the service chain identifier, multiple service processings that belong to the first service and need to be performed on the first packet flow and a sequence of performing the multiple service processings; and performing the multiple service processings on the first packet flow according to the sequence.

In combination with the eighth aspect, in a first possible implementation manner of the eighth aspect, the operating, according to the service deployment information, the operation file necessary for deploying the first service, so as to deploy the first service, includes:

loading and operating, according to the service deployment information, multiple service components for deploying the first service, so as to deploy the first service;

wherein the determining, according to the service chain identifier, multiple service processings that belong to the first service and need to be performed on the first packet flow and the sequence of performing the multiple service processings, includes:

inquiring a service routing table according to the service chain identifier to determine multiple service processing components from the multiple service components and a utilization sequence of the multiple service processing components, the multiple service processing components being service components in the multiple service components that are used for implementing the multiple service processings; and wherein performing the multiple service processings on the first packet flow according to the sequence, includes:

utilizing the multiple service processing components to process the first packet flow according to the utilization sequence of the multiple service processing components.

In combination with the first possible implementation manner of the eighth aspect, in a second possible implementation manner of the eighth aspect, the inquiring a service routing table according to the service chain identifier to determine multiple service processing components from the multiple service components and a utilization sequence of the multiple service processing components, includes:

the inquiring the service routing table according to the service chain identifier to determine multiple service processing components from the multiple service components and the utilization sequence of the multiple service processing components, includes:

inquiring, according to the service chain identifier and a first ingress port, a first service routing table entry to determine an egress port reaching a first service processing component, wherein the first ingress port is an ingress port receiving the first packet flow, and the first service processing component is used for performing first service processing in the multiple service processings;

steering the first packet flow to the first service processing component;

receiving the first packet flow subjected to the first service processing;

inquiring a second service routing table entry according to a second ingress port to determine an egress port reaching a second service processing component, wherein the second ingress port is an ingress port receiving the first packet flow subjected to the first service processing, and the second service processing component is used for performing second service processing in the multiple service processings; and steering the first packet flow subjected to the first service processing to the second service processing component.

In combination with the second possible implementation manner of the eighth aspect, in a third possible implementation manner of the eighth aspect, the inquiring the second service routing table entry according to the second ingress port to determine the egress port reaching the second service processing component, includes:

inquiring, according to the service chain identifier and the second ingress port, the second service routing table entry to determine the egress port reaching the second service component.

In combination with the eighth aspect or the first possible implementation manner of the eighth aspect or the second possible implementation manner of the eighth aspect or the third possible implementation manner of the eighth aspect, in a fourth possible implementation manner of the eighth aspect, the method further includes:

receiving a resource adjustment message, wherein the resource adjustment message includes information of resource needing to be occupied currently by the operation file; and adjusting resource occupied by the operation file according to the resource adjustment message.

In combination with the eighth aspect or the first possible implementation manner of the eighth aspect or the second possible implementation manner of the eighth aspect or the third possible implementation manner of the eighth aspect or the fourth possible implementation manner of the eighth aspect, in a fifth possible implementation manner of the eighth aspect, the service deployment information includes address information of the operation file.

In a ninth aspect, a method for carrying out a service in a network is provided, including:

receiving service flow identification information for identifying a first packet flow and service flow steering information;

identifying the first packet flow from received packet flow according to the service flow identification information;

adding a service chain identifier to the first packet flow; and steering the first packet flow carrying the service chain identifier to a computing apparatus according to the service flow steering information.

In combination with the ninth aspect, in a first possible implementation manner of the ninth aspect, the service flow steering information includes at least one of the following:

an internet protocol (IP) address of the computing apparatus, port information of the computing apparatus and identification information of an operation file necessary for deploying the first service.

In a tenth aspect, a method for carrying out a service in a network is provided, including:

receiving a service request for requesting to carry out a service, wherein the service request includes service deployment information for requesting to deploy a first service, service flow identification information for identifying a first packet flow and service flow steering information;

identifying the first packet flow from received packet flow according to the service flow identification information;

steering the first packet flow to a computing apparatus according to the service flow steering information; and operating, according to the service deployment information, an operation file necessary for deploying the first service, so as to deploy the first service, and performing processing of the first service on the steered first packet flow after the first service is deployed.

In an eleventh aspect, a method for carrying out a service in a network is provided, including:

receiving a service request for requesting to carry out a service, wherein the service request includes service deployment information for requesting to deploy a first service and service flow identification information for identifying a first packet flow;

identifying the first packet flow from received packet flow according to the service flow identification information; and operating, according to the service deployment information, an operation file necessary for deploying the first service, so as to deploy the first service, and performing processing of the first service on the identified first packet flow after the first service is deployed.

In combination with the eleventh aspect, in a first possible implementation manner of the eleventh aspect, before the performing processing of the first service on the identified first packet flow, the method further includes:

adding a service chain identifier to the first packet flow; and wherein the operating, according to the service deployment information, the operation file necessary for deploying the first service, so as to deploy the first service, and performing processing of the first service on the identified first packet flow after the first service is deployed, includes:

loading and operating multiple service components for deploying the first service, so as to deploy the first service;

determining, according to the service chain identifier, multiple service processings that belong to the first service and need to be performed on the first packet flow and a sequence of performing the multiple service processings; and performing the multiple service processings on the first packet flow according to the sequence.

In combination with the first possible implementation manner of the eleventh aspect, in a second possible implementation manner of the eleventh aspect, the determining, according to the service chain identifier, multiple service processings that belong to the first service and need to be performed on the first packet flow and the sequence of performing the multiple service processings, includes:

inquiring a service routing table according to the service chain identifier to determine multiple service processing components from the multiple service components and a utilization sequence of the multiple service processing components, wherein the multiple service processing components are service components in the multiple service components that are used for implementing the multiple service processings; and utilizing the multiple service processing components to process the first packet flow according to the utilization sequence of the multiple service processing components.

In the technical solutions of the present invention, the control apparatus receives the service request, controls, according to the service deployment information in the service request, the computing apparatus to operate the operation file necessary for deploying the first service, and controls, according to the service flow identification information and the service flow steering information in the service request, the identifying and steering apparatus to identify the first packet flow and steer the identified first packet flow to the computing apparatus deploying the first service, so as to enable the computing apparatus to perform processing of the first service on the first packet flow. According to the system for carrying out a service in a network provided by the present embodiment, the network is combined with the operation file necessary for deploying the service, and a related operation file is allowed to be loaded and operated only when the service is deployed, rather than being developed and set in a device by a device manufacturer as in the prior art, thereby providing an open service mode to allow an operator to deviate from a device manufacturer and develop a new service functionality, which in turn may reduce an amount of time necessary for carrying out a new service functionality and meet rapid developing needs of OTT applications.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DESCRIPTION OF EMBODIMENTS

In order to make the purpose, technical solutions and advantages of the embodiments of the present invention more clear, a detailed description of the embodiments in the present invention will be given below in combination with accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

Figure 1:
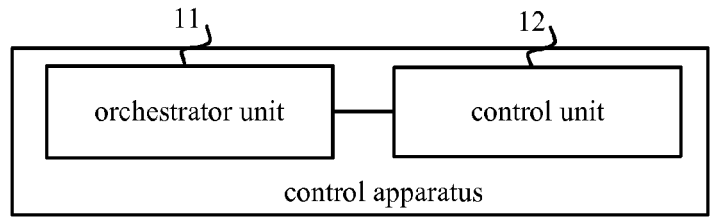
FIG. 1 is a schematic diagram of a structure of a control apparatus provided by an embodiment of the present invention.

FIG. 1 is a schematic diagram of a structure of a control apparatus provided by an embodiment of the present invention. As shown in FIG. 1, the device includes an orchestrator unit 11 and a control unit 12.

The orchestrator unit 11 is configured to receive a service request for requesting to carry out a service, wherein the service request includes service deployment information for requesting to deploy a first service, service flow identification information for identifying a first packet flow and service flow steering information.

The control unit 12 is connected to the orchestrator unit 11, and is configured to send the service deployment information received by the orchestrator unit 11 to a computing apparatus, and send the service flow identification information and the service flow steering information received by the orchestrator unit 11 to an identifying and steering apparatus.

The service deployment information may include address information of an operation file necessary for deploying the first service, but is not limited hereto. For example, the service deployment information may further include some other information related to the first service to be deployed, such as, for example, user information, service characteristic information, etc. Optionally, the address information of the operation file necessary for deploying the first service may be path information for accessing the operation file and filename information of the operation file, or may be uniform resource locator (Uniform Resource Locator, referred to as URL shortly) information directing to the operation file, etc.

The above-mentioned service flow identification information is primarily used for indicating a packet flow needing to be identified, and in the present embodiment, the packet flow needing to be identified is a packet flow of the first service needing to be deployed. To simplify the description, in the embodiment of the present invention, a packet flow of the first service is referred to as a first packet flow, and correspondingly, the above-mentioned service flow identification information is primarily used for indicating the first packet flow needing to be identified.

The service flow identification information may include, but is not limited to, at least one of the following: information on a physical port receiving the first packet flow (i.e., source physical port information of the first packet flow), information on a logical port receiving the first packet flow (i.e., source logical port information of the first packet flow), URL information accessed by the first packet flow, as well as a source internet protocol (Internet Protocol, referred to as IP shortly) address, a target IP address, source transmission layer port information and target transmission layer port information of the first packet flow.

The above-mentioned service flow steering information is mainly used for indicating that the first packet flow is to be steered to a computing apparatus responsible for deploying the first service.

The service flow steering information includes, but is not limited to, at least one of the following: an IP address of the computing apparatus, port information of the computing apparatus, and identification information of an operation file necessary for deploying the first service, such as, for example, filename information, etc.

After receiving the service flow identification information and the service flow steering information, the identifying and steering apparatus identifies the first packet flow from received packet flow according to the service flow identification information, and steers the identified first packet flow to the computing apparatus according to the service flow steering information. After receiving the service deployment information, the computing apparatus operates, according to the service deployment information, the operation file necessary for deploying the first service, so as to deploy the first service, and performs processing of the first service on the first packet flow sent by the identifying and steering apparatus.

In an optional implementation manner, the first packet flow may need to be subjected to multiple service processings. Based on this, besides being configured to send the service flow identification information and the service flow steering information to the identifying and steering apparatus, the control unit 12 is further configured to send a service chain identifier to the identifying and steering apparatus. The service chain identifier is used for indicating multiple service processings that belong to the first service and are performed on the first packet flow and indicating a sequence of performing the multiple service processings.

On implementation, the service chain identifier may be a virtual local area network (Virtual Local Area Network, referred to as VLAN shortly) label, a multi-protocol label switching (Multi-Protocol Label Switching, referred to as MPLS shortly) label, a VXLAN network identifier (VXLAN Network Identifier, referred to as VNI shortly) in virtual extensible local area network (Virtual eXtensible Local Area Network, referred to as VXLAN shortly) encapsulation, or carried in an information field added beyond an original packet. Please refer to IETF draft: draft-mahalingam-dutt-dcops-vxlan-03.txt for VXLAN.

Based on this, the identifying and steering apparatus sends the first packet flow to the computing apparatus by adding the service chain identifier to the first packet flow. The computing apparatus obtains the service chain identifier from the first packet flow, according to the service chain identifier, determines multiple service processings that belong to the first service and need to be performed on the first packet flow and determines a sequence of performing the multiple service processings, and performs the multiple service processings on the first packet flow according to the sequence.

In an optional implementation manner, the sending, by the control unit 12, the service deployment information to the computing apparatus and sending the service flow identification information and the service flow steering information to the identifying and steering apparatus, includes that, the control unit 12 may be specifically configured to send a load command message to the computing apparatus, and send a flow control message to the identifying and steering apparatus, wherein the load command message includes the service deployment information, and the flow control message includes the service flow identification information and the service flow steering information.

Based on the above, in an optional implementation manner, the control unit 12 is further configured to send a resource adjustment message to the computing apparatus, wherein the resource adjustment message includes information about resource needing to be occupied currently by an operation file necessary for deploying the first service. Based on this, according to the information about the resource needing to be occupied currently by the operation file contained in the resource adjustment message, the computing apparatus may adjust information about resource occupied by the operation file.

Figure 2:
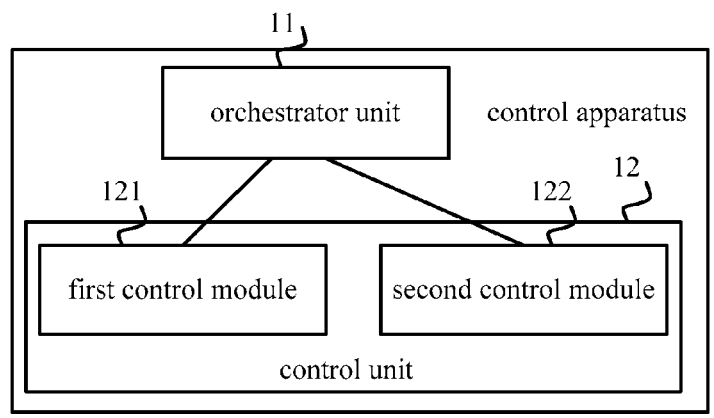
FIG. 2 is a schematic diagram of a structure of another control apparatus provided by an embodiment of the present invention.

Based on the foregoing, as shown in FIG. 2, an implementation structure of the control unit 12 includes: a first control module 121 and a second control module 122.

Based on this, the orchestrator unit 11 is further configured to send a first control message to the first control module 121 and send a second control message to the second control module 122. The first control message includes the service flow identification information and the service flow steering information, and the second control message includes the service deployment information.

The first control module 121 is configured to receive a first control message sent by the orchestrator unit 11, and send a load command message to the identifying and steering apparatus according to the first control message.

The second control module 122 is configured to receive a second control message sent by the orchestrator unit 11, and send a load command message to the computing apparatus according to the second control message.

Furthermore, the second control module 122 is further configured to send a resource adjustment message to the computing apparatus.

According to the control apparatus provided by the present embodiment, by receiving the service request and providing the service deployment information as well as the service flow identification information and the service flow steering information contained in the service request to the computing apparatus and the identifying and steering apparatus, the computing apparatus is enabled to deploy the first service, and the identifying and steering apparatus is enabled to identify the packet flow of the first service and steer the packet flow of the first service to the computing apparatus for processing. The control apparatus controls, according to the service deployment information, the computing device to record and operate an operation file necessary for deploying a service only when the control apparatus provided by the present embodiment carries out the service, thereby providing an open service mode to allow an operator to deviate from a device manufacturer and develop a new service function, which in turn may reduce an amount of time necessary for carrying out a new service functionality, and meet rapid developing needs of OTT applications.

Figure 3:
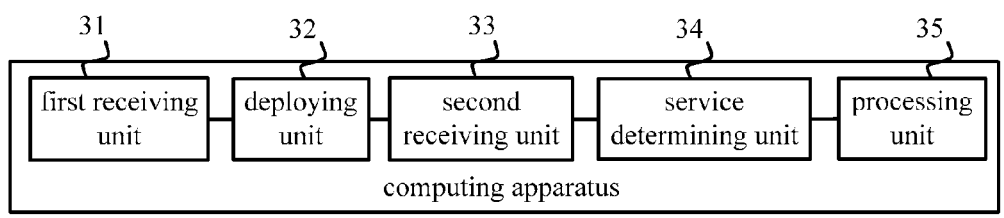
FIG. 3 is a schematic diagram of a structure of a computing apparatus provided by an embodiment of the present invention.

FIG. 3 is a schematic diagram of a structure of a computing apparatus provided by an embodiment of the present invention. As shown in FIG. 3, the computing apparatus includes a first receiving unit 31, a deploying unit 32, a second receiving unit 33, a service determining unit 34 and a processing unit 35.

The first receiving unit 31 is configured to receive service deployment information that is sent by the control apparatus and used for requesting to deploy a first service.

The deploying unit 32 is connected to the first receiving unit 31, and is configured to operate, according to the service deployment information received by the first receiving unit 31, an operation file necessary for deploying the first service, so as to deploy the first service.

The second receiving unit 33 is configured to receive a first packet flow sent by the identifying and steering apparatus, wherein the first packet flow includes a service chain identifier.

The service determining unit 34 is connected to the second receiving unit 33, and is configured to determine, according to the service chain identifier received by the second receiving unit 33, multiple service processings that belong to the first service and need to be performed on the first packet flow and a sequence of performing the multiple service processings.

The processing unit 35 is connected to the service determining unit 34, and is configured to perform the multiple service processings on the first packet flow according to the sequence determined by the service determining unit 34.

The control apparatus in the present embodiment may be implemented with the structure as shown in FIG. 1 or FIG. 2, but is not limited hereto. The control apparatus is primarily responsible for controlling the computing apparatus and the identifying and steering apparatus to complete deployment of the first service and processing on the packet flow of the first service.

The service deployment information may include address information of an operation file necessary for deploying the first service, but is not limited hereto. For example, the service deployment information may further include some other information related to the first service to be deployed, such as, for example, user information, service characteristic information, etc. Optionally, the address information of the operation file necessary for deploying the first service may be path information for accessing the operation file and filename information of the operation file, or may be URL information directing to the operation file, etc. Based on this, the deploying unit 32 may be specifically configured to obtain the operation file according to the address information of the operation file contained in the service deployment information, and then operate the operation file, so as to deploy the first service.

In the present embodiment, a packet flow of the first service is referred to as a first packet flow. In an optional implementation manner, the first packet flow needs to be subjected to multiple service processings. Therefore, besides sending the service flow identification information and the service flow steering information to the identifying and steering apparatus, the control apparatus further sends a service chain identifier to the identifying and steering apparatus. The identifying and steering apparatus identifies the first packet flow from received packet flow according to the service flow identification information sent by the control apparatus, adds the service chain identifier sent by the control apparatus to the first packet flow, and sends the first packet flow carrying the service chain identifier to the second receiving unit 33 according to the service flow steering information sent by the control apparatus.

In the present embodiment, the service chain identifier is used for indicating multiple service processings that belong to the first service and are performed on the first packet flow and indicating a sequence of performing the multiple service processings. Based on this, according to indication of the service chain identifier, the service determining unit 34 determines the multiple service processings that belong to the first service and need to be performed on the first packet flow and determines the sequence of performing the multiple service processings; and the processing unit 35 performs the multiple service processings on the first packet flow according to the sequence determined by the service determining unit 34.

In an implementation, the service chain identifier may be a VLAN label, an MPLS label, a VNI in VXLAN encapsulation, or carried in an information field added beyond an original packet.

In an optional implementation manner, the operating, by the deploying unit 32 according to the service deployment information, the operation file necessary for deploying the first service, so as to deploy the first service, includes that, the deploying unit 32 is specifically configured to load and operate, according to the service deployment information, multiple service components used for deploying the first service, so as to deploy the first service. The multiple service components mentioned herein are specifically carried by the operation file necessary for deploying the first service. Namely, the deploying unit 32 is specifically configured to load and operate, according to the service deployment information, the multiple service components carried by the operation file necessary for deploying the first service, so as to deploy the first service.

Correspondingly, the determining, by the service determining unit 34 according to the service chain identifier, the multiple service processings that belong to the first service and need to be performed on the first packet flow and the sequence of performing the multiple service processings, includes that, the service determining unit 34 is specifically configured to inquire a service routing table according to the service chain identifier to determine multiple service processing components from the multiple service components and a utilization sequence of the multiple service processing components, wherein the multiple service processing components are service components in the multiple service components that are used for implementing the multiple service processings.

Correspondingly, the performing, by the processing unit 35, the multiple service processings on the first packet flow according to the sequence determined by the service determining unit 34, includes that, the processing unit 35 is specifically configured to utilize the multiple service processing components determined by the service determining unit 34 to process the first packet flow according to the utilization sequence of the multiple service processing components determined by the service determining unit 34.

Further, optionally, the service determining unit 34 being configured to inquire the service routing table according to the service chain identifier to determine multiple service processing components from the multiple service components and the utilization sequence of the multiple service processing components, includes that, the service determining unit 34 is specifically configured to: a first service routing table entry according to the service chain identifier and a first ingress port to determine an egress port reaching a first service processing component, wherein the first ingress port is an ingress port receiving the first packet flow, and the first service processing component is used for performing first service processing in the multiple service processings;

steer the first packet flow to the first service processing component;

receive the first packet flow subjected to the first service processing;

inquire a second service routing table entry according to a second ingress port to determine an egress port reaching a second service processing component, wherein the second ingress port is an ingress port receiving the first packet flow subjected to the first service processing, and the second service processing component is used for performing second service processing in the multiple service processings; and steer the first packet flow subjected to the first service processing to the second service processing component.

Further, the service determining unit 34 being configured to inquire the second routing table entry according to the second ingress port to determine the egress port reaching the second service processing component, includes that, the service determining unit 34 is specifically configured to inquire the second service routing table entry according to the service chain identifier and the second ingress port to determine the egress port reaching the second service component.

It is illustrated herein that, the foregoing descriptions merely give a situation that the multiple service processings needing to be performed on the first packet flow include two service processings, but is not limited hereto. When the multiple service processings needing to be performed on the first packet flow include more than two service processings, the processings may be conducted according to a processing manner similar to the above.

In an optional implementation manner, besides being configured to receive the service deployment information sent by the control apparatus, the first receiving unit 31 is further configured to receive a resource adjustment message sent by the control apparatus, wherein the resource adjustment message includes information on resource needing to be occupied currently by the operation file necessary for deploying the first service. Based on this, besides being configured to operate, according to the service deployment information received by the first receiving unit 31, the operation file necessary for deploying the first service, the deploying unit 32 is further configured to adjust resource occupied by the operation file according to the resource adjustment message received by the first receiving unit 31.

On specific implementation, the computing apparatus in the present embodiment may be a server device, but is not limited hereto. If the computing apparatus in the present embodiment is a server device, the above-mentioned service determining unit 34 may be implemented in a virtual switch (Vswitch) of the server device, but is not limited hereto.

The computing apparatus provided by the present embodiment receives the service deployment information sent by the control apparatus, operates, according to the service deployment information, the operation file for deploying the first service, receives the packet flow of the first service that is sent by the identifying and steering apparatus under the control of the control apparatus and carries the service chain identifier, determines, based on the service chain identifier, the service processings needing to be performed on the first packet flow and the sequence of performing the service processings, and then performs the processings of the first service on the first packet flow according to the sequence. Thus it can be seen that, the computing apparatus provided by the present embodiment may cooperate with the identifying and steering apparatus under the control of the control apparatus, and operate the operation file of the service needing to be deployed only when the service needs to be deployed, so as to complete deployment of the service and processing on the packet flow of the deployed service, thereby providing an open service mode to allow an operator to deviate from a device manufacturer and develop a new service functionality, which in turn may reduce the amount of time necessary for carrying out a new service functionality and meet rapid developing needs of OTT applications.

Figure 4:
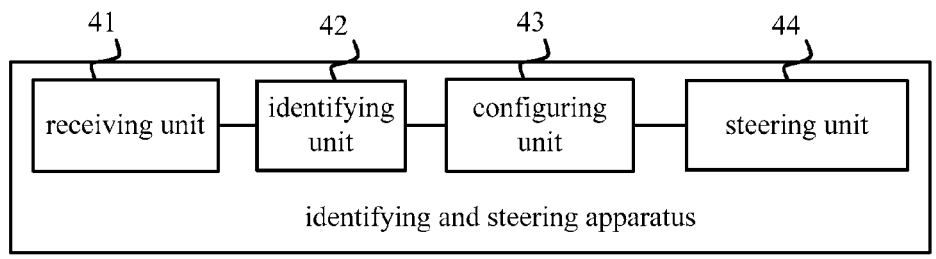
FIG. 4 is a schematic diagram of a structure of an identifying and steering apparatus provided by an embodiment of the present invention.

FIG. 4 is a schematic diagram of a structure of an identifying and steering apparatus provided by an embodiment of the present invention. As shown in FIG. 4, the apparatus includes a receiving unit 41, an identifying unit 42, a configuring unit 43 and a steering unit 44.

The receiving unit 41 is configured to receive service flow identification information for identifying a first packet flow and service flow steering information sent by a control apparatus.

The identifying unit 42 is connected to the receiving unit 41, and is configured to identify the first packet flow from received packet flow according to the service flow identification information received by the receiving unit 41.

The configuring unit 43 is connected to the identifying unit 42, and is configured to add a service chain identifier to the first packet flow identified by the identifying unit 42.

The steering unit 44 is connected to the receiving unit 41 and the configuring unit 43, and is configured to steer the first packet flow carrying the service chain identifier to a computing apparatus according to the service flow steering information received by the receiving unit 41.

The control apparatus in the present embodiment may be implemented with the structure as shown in FIG. 1 or FIG. 2, but is not limited hereto. The computing apparatus provided by the present embodiment may be implemented with the structure as shown in FIG. 3, but is not limited hereto.

In the present embodiment, after receiving a service request for requesting to carry out a service, the control apparatus sends the service flow identification information and the service flow steering information contained in the service request to the identifying and steering apparatus, so as to enable the identifying and steering apparatus to identify a packet flow of the first service needing to be deployed (i.e., the first packet flow) from the received packet flow, and to steer the identified packet flow to the computing apparatus. In addition, the control apparatus further sends the service deployment information contained in the service request to the computing apparatus, such that the computing apparatus is enabled to operate an operation file of the first service needing to be deployed, so as to deploy the first service, and the computing apparatus is enabled to process the first packet flow after the first service is deployed.

The above-mentioned service flow identification information is primarily used for indicating the first packet flow needing to be identified, and the first packet flow is a packet flow of the first service needing to be deployed.

The service flow identification information may include, but is not limited to, at least one of the following: information on a physical port receiving the first packet flow (i.e., source physical port information of the first packet flow), information on a logical port receiving the first packet flow (i.e., source logical port information of the first packet flow), URL information accessed by the first packet flow, as well as a source IP address, a target IP address, source transmission layer port information and target transmission layer port information of the first packet flow. Based on this, the identifying unit 42 may identify the first packet flow from the received packet flow according to the service flow identification information, which is illustrated below with examples.

For instance, if the service flow identification information is the source physical port information or the logical port information of the first packet flow, the identifying unit 42 may determine, according to the physical port information or the logical port information, the first packet flow to be a packet flow in respective received packet flows that is from a physical port indicated by the physical port information or from a logical port indicated by the logical port information from. For another instance, if the service flow identification information is URL information designated to be accessed, the identifying unit 42 may determine, according to the URL information, the first packet flow to be a packet flow in the respective received packet flows that is used for accessing a webpage indicated by the URL information.

The above-mentioned service flow steering information is primarily used for indicating that the first packet flow is to be steered to a computing apparatus responsible for deploying the first service.

The service flow steering information includes, but is not limited to, at least one of the following: an IP address of the computing apparatus, port information of the computing apparatus and identification information of the operation file necessary for deploying the first service, such as, for example, filename information, etc. Based on this, the steering unit 44 may specifically steer the first packet flow to a corresponding computing apparatus according to the service flow steering information.

After receiving the service deployment information, the computing apparatus operates, according to the service deployment information, the operation file necessary for deploying the first service, so as to deploy the first service, and performs processing of the first service on the first packet flow sent by the steering unit 44 of the identifying and steering apparatus.

In the present embodiment, the first packet flow may need to be subjected to multiple service processings. The identifying and steering apparatus is aware of that the first packet flow needs to be subjected to multiple service processings, so the identifying and steering apparatus adds a service chain identifier to the first packet flow via the configuring unit 43 thereof, so as for indicating the multiple service processings that belong to the first service and are performed on the first packet flow and indicating a sequence of performing the multiple service processings. In this way, the first packet flow sent from the steering unit 44 to the computing apparatus carries the service chain identifier. The computing apparatus may obtain the service chain identifier from the first packet flow, and according to the service chain identifier, determine the multiple service processings that belong to the first service and need to be performed on the first packet flow and determine the sequence of performing the multiple service processings, and then perform the multiple service processings on the first packet flow according to the sequence.

It is illustrated herein that, the identifying and steering apparatus may specifically receive the service chain identifier sent by the control apparatus, but is not limited hereto.

On implementation, the above-mentioned service chain identifier may be a VLAN label, an MPLS label, a VNI in VXLAN encapsulation, or carried in an information field added beyond an original packet.

The identifying and steering apparatus provided by the present embodiment receives the service flow identification information and the service flow steering information sent by the control apparatus, identifies the packet flow of the first service needing to be deployed from the received packet flow according to the service flow identification information, adds the service chain identifier to the packet flow under the condition that multiple service processings are needed to be implemented on the packet flow, and then steers the packet flow carrying the service chain identifier to the computing apparatus according to the service flow steering information, so as to enable the computing apparatus deployed with the first service under the control of the control apparatus to complete processing on the packet flow of the first service. The identifying and steering apparatus provided by the present embodiment cooperates with the computing apparatus under the control of the control apparatus, such that the operation file of the service needing to be deployed is allowed to be operated only when the service is needed to be deployed, thereby completing deployment of the service and processing on a corresponding packet flow, and providing an open service mode to allow an operator to deviate from a device manufacturer and develop a new service function, which in turn may reduce the amount of time necessary for carrying out a new service functionality and meet rapid developing needs of OTT applications.

Figure 5:
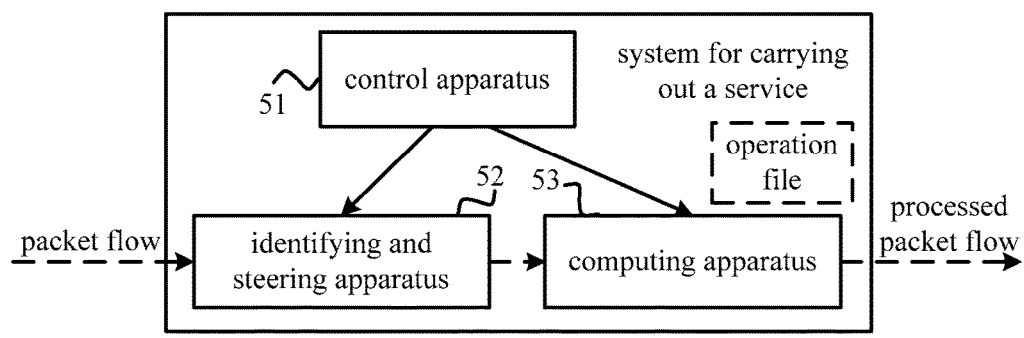
FIG. 5 is a schematic diagram of a structure of a system for carrying out a service in a network provided by an embodiment of the present invention.

FIG. 5 is a schematic diagram of a structure of a system for carrying out a service in a network provided by an embodiment of the present invention. As shown in FIG. 5, the system includes a control apparatus 51, an identifying and steering apparatus 52 and a computing apparatus 53. In FIG. 5, a solid line with an arrow denotes a control flow for the control apparatus 51 to control the computing apparatus 53 and the identifying and steering apparatus 52, and a dotted line with an arrow denotes a packet flow direction.

The control apparatus 51 may be implemented with the structure as shown in FIG. 1 or FIG. 2, and will not be described redundantly herein.

The identifying and steering apparatus 52 is configured to:
receive service flow identification information for identifying a first packet flow and service flow steering information sent by the control apparatus 51;
identify the first packet flow from received packet flow according to the service flow identification information; and
steer the first packet flow to the computing apparatus 53 according to the service flow steering information.

The computing apparatus 53 is configured to:
receive service deployment information that is sent by the control apparatus 51 and used for requesting to deploy a first service;
operate, according to the service deployment information, an operation file necessary for deploying the first service, so as to deploy the first service;
receive the first packet flow sent by the identifying and steering apparatus 52; and
perform processing of the first service on the first packet flow.

The foregoing embodiment may be referred to for detailed descriptions of the service flow identification information, the service flow steering information, the service deployment information, the first service, the first file and the like.

Compared with the computing apparatus provided by the above-mentioned FIG. 3, besides capable of performing multiple service processings on the first packet flow, the computing apparatus 53 in the system provided by the present embodiment may also perform one service processing on the first packet flow.

Compared with the identifying and steering apparatus provided by the above-mentioned FIG. 4, besides capable of adding the service chain identifier to the first packet flow, the identifying and steering apparatus 52 in the system provided by the present embodiment may also add no service chain identifier to the first packet flow, namely, may directly steer the identified first packet flow to the computing apparatus 53.

For the process of guiding the identified first packet flow directly to the computing apparatus 53 by the identifying and steering apparatus 52 and the process of performing processing of the first service on the first packet flow by the computing apparatus 53, please refer to descriptions of a computing apparatus 20 and an identifying and steering apparatus 30 in the following embodiment, which will not be described redundantly herein.

Figure 6:
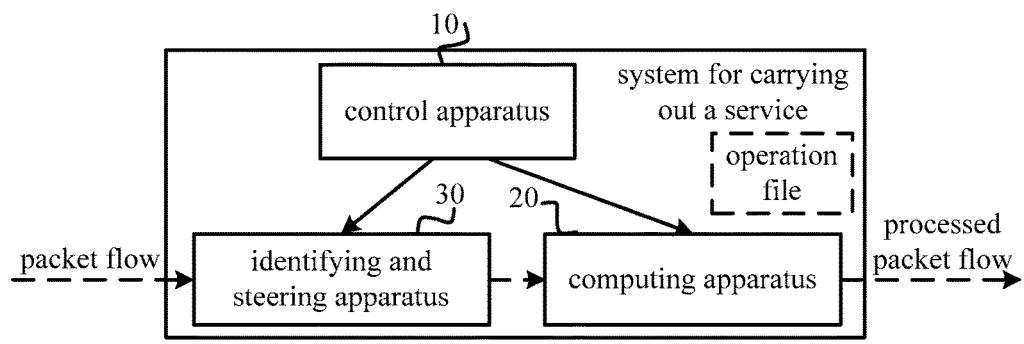
FIG. 6 is a schematic diagram of a structure of another system for carrying out a service in a network provided by an embodiment of the present invention.

FIG. 6 is a schematic diagram of a structure of another system for carrying out a service in a network provided by an embodiment of the present invention. As shown in FIG.

6, the system includes a control apparatus 10, a computing apparatus 20 and an identifying and steering apparatus 30.

The control apparatus 10 is configured to receive a service request for requesting to carry out a service, wherein the service request includes service deployment information for requesting to deploy a first service, service flow identification information for identifying a first packet flow and service flow steering information.

The service deployment information is primarily used for providing information directing to an operation file necessary for the service requested to be deployed. For instance, the service deployment information may include address information of the operation file necessary for the service requested to be deployed. For convenience of description, in the embodiment of the present invention, the service requested to be deployed is referred to as the first service.

The service deployment information may include address information of the operation file necessary for deploying the first service, but is not limited hereto. For instance, the service deployment information may further include some other information related to the first service to be deployed, such as, for example, user information, service characteristic information, etc. Optionally, the address information of the operation file may be path information for accessing the operation file and filename information of the operation file, or may be URL information directing to the operation file, etc.

The above-mentioned service flow identification information is primarily used for indicating a packet flow needing to be identified, and in the present embodiment, the packet flow needing to be identified is a packet flow of the first service requested to be deployed. To simplify the description, in the embodiment of the present invention, a packet flow of the first service is referred to as a first packet flow, and thus the above-mentioned service flow identification information is primarily used for indicating the first packet flow needing to be identified.

The service flow identification information may include, but is not limited to, at least one of the following: information on a physical port receiving the first packet flow (i.e., source physical port information of the first packet flow), information on a logical port receiving the first packet flow (i.e., source logical port information of the first packet flow), URL information accessed by the first packet flow, as well as a source IP address, a target IP address, source transmission layer port information and target transmission layer port information of the first packet flow.

The above-mentioned service flow steering information is primarily used for indicating that the first packet flow is to be steered to the computing apparatus 20 deploying the first service.

The service flow steering information includes, but is not limited to, at least one of the following: an IP address of the computing apparatus 20, port information of the computing apparatus 20 and identification information of the operation file. For example, the identification information may be filename information of the operation file, URL information of the operation file, etc.

In the present embodiment, the control apparatus 10, on one hand, provides an application programming interface (Application Programming Interface, referred to as API shortly) to the external, wherein the term "to the external" refers to a device or a person requesting to deploy the first service. For example, the control apparatus 10 may provide an API to an administrator, or may provide an API to an OTT application server, etc. The API is primarily used for implementing two functions: one is to provide address information of the operation file necessary for deploying the first service; and the other is to provide information for identifying and steering the first packet flow, i.e., the service flow identification information and the service flow steering information. The two primary functions of the API may be implemented with the above-mentioned service request, that is, the service deployment information, the service flow identification information and the service flow steering information are carried in the service request.

It is illustrated herein that, the above-mentioned service request may be carried by one API message, or may be carried by two or more API messages. Correspondingly, the service deployment information, the service flow identification information and the service flow steering information may be carried in one API message or carried in two or more API messages.

Further, after obtaining the service deployment information, the service flow identification information and the service flow steering information, the control apparatus 10 is further configured to control, according to the service deployment information, the computing apparatus 20 to operate the operation file necessary for deploying the first service, and control, according to the service flow identification information and the service flow steering information, the identifying and steering apparatus 30 to identify the first packet flow and to steer the identified first packet flow to the computing apparatus 20.

Correspondingly, the computing apparatus 20 is configured to receive the service deployment information sent by the control apparatus 10, operate, according to the service deployment information, the operation file necessary for deploying the first service, and perform processing of the first service on the first packet flow sent by the identifying and steering apparatus 30.

The identifying and steering apparatus 30 is configured to receive the service flow identification information and the service flow steering information sent by the control apparatus 10, identify the first packet flow from received packet flow according to the service flow identification information, and steer the identified first packet flow to the computing apparatus 20 according to the service flow steering information. The packet flow received by the identifying and steering apparatus 30 may be from a user side link, or may be from a network side link, that is, a network link connected to the identifying and steering apparatus 30 may include a user side link or include a network side link.

In FIG. 6, a solid line with an arrow denotes a control flow for the control apparatus 10 to control the computing apparatus 20 and the identifying and steering apparatus 30, and a dotted line with an arrow denotes a packet flow direction.

It is illustrated herein that, the control apparatus 10 in the present embodiment may be implemented with the structure as shown in FIG. 1 or FIG. 2, the computing apparatus in the present embodiment may be implemented with the structure as shown in FIG. 3, and the identifying and steering apparatus 30 in the present embodiment may be implemented with the structure as shown in FIG. 4, but the present invention is not limited hereto.

In the present embodiment, the control apparatus receives the service request, controls, according to the service deployment information in the service request, the computing apparatus to operate the operation file necessary for deploying the first service, and controls, according to the service flow identification information and the service flow steering information in the service request, the identifying and steering apparatus to identify the first packet flow and steer the identified first packet flow to the computing apparatus deploying the first service, so as to enable the computing apparatus to perform processing of the first service on the first packet flow. According to the system for carrying out a service in a network provided by the present embodiment, the network is combined with the operation file necessary for deploying the service, and a related operation file is allowed to be loaded and operated only when the service is deployed, rather than being developed and set in a device by a device manufacturer as in the prior art, thereby providing an open service mode to allow an operator to deviate from a device manufacturer and develop a new service functionality, which in turn may reduce an amount of time necessary for carrying out a new service functionality and meet rapid developing needs of OTT applications.

Figure 7:
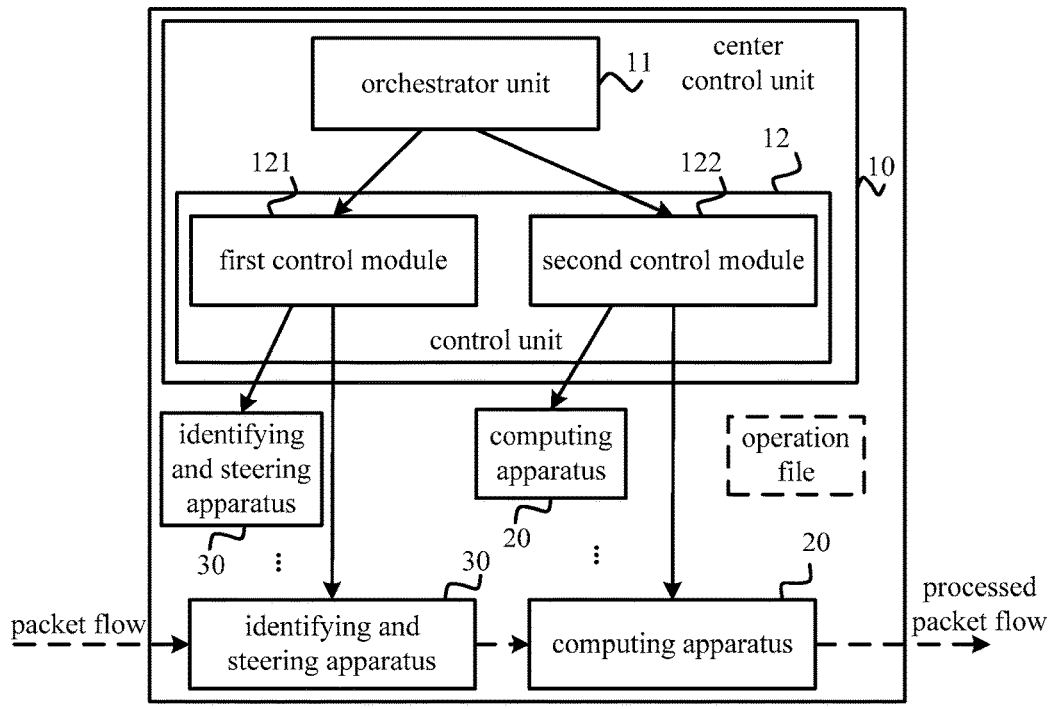
FIG. 7 is a schematic diagram of a structure of another system for carrying out a service in a network provided by an embodiment of the present invention.

FIG. 7 is a schematic diagram of a structure of another system for carrying out a service in a network provided by an embodiment of the present invention. As shown in FIG. 7, the system includes a control apparatus 10, a computing apparatus 20 and an identifying and steering apparatus 30, wherein the control apparatus 10 includes an orchestrator (Orchestrator) unit 11 and a control unit 12, the control unit 12 including a first control module 121 and a second control module 122. Similarly, in FIG. 7, a solid line with an arrow denotes a control flow for the control apparatus 10 to control the computing apparatus 20 and the identifying and steering apparatus 30, and a dotted line with an arrow denotes a packet flow direction.

The orchestrator unit 11 is configured to provide an API to the external, and is primarily configured to receive a service request for requesting to carry out a service, wherein the service request includes service deployment information for requesting to deploy a first service, service flow identification information for identifying a first packet flow and service flow steering information. For detailed descriptions of various information included in the service request, please refer to the embodiment as shown in FIG. 6, and will not be described redundantly herein.

Furthermore, the orchestrator unit 11 is further configured to send a first control message to the first control module 121 and send a second control message to the second control module 122, wherein the first control message includes the service flow identification information and the service flow steering information, and the second control message includes the service deployment information.

The second control module 122 is configured to receive the second control message sent by the orchestrator unit 11, and send a load command message to the computing apparatus 20 according to the second control message, so as to control the computing apparatus 20 to operate an operation file necessary for deploying the first service, wherein the load command message includes the service deployment information.

Correspondingly, the computing apparatus 20 may be specifically configured to receive the load command message sent by the second control module 122, obtain the operation file according to the service deployment information in the load command message, and load and operate the operation file. For example, if address information of the operation file in the service deployment information is path information for accessing the operation file and a filename of the operation file, the computing apparatus 20 may specifically obtain the operation file according to the path information and the filename. If the address information of the operation file in the service deployment information is information about a URL directing to the operation file, the computing apparatus 20 may specifically access the URL to obtain the operation file.

In an optional implementation manner, the orchestrator unit 11 may be further configured to send a resource adjustment message to the second control module 122, so as to enable the second control module 122 to control the computing apparatus 20 to adjust resource occupied by the operation file, wherein the resource adjustment message includes information about resource needing to be occupied currently by the operation file. It is illustrated herein that, the orchestrator unit 11 may acquire the information about the resource needed by the operation file.

The second control module 122 is further configured to receive the resource adjustment message sent by the orchestrator unit 11, and control the computing apparatus 20 to adjust the resource occupied by the operation file according to the resource adjustment message.

The first control module 121 is configured to receive the first control message sent by the orchestrator unit 11, send a flow control message to the identifying and steering apparatus 30 according to the first control message, and control the identifying and steering apparatus 30 to identify the first packet flow from the received packet flow and to steer the identified first packet flow to the computing apparatus 20, wherein the flow control message includes the service flow identification information and the service flow steering information.

Correspondingly, the identifying and steering apparatus 30 may be specifically configured to receive packet flow(s), receive the flow control message sent by the first control module 121, identify the first packet flow from the received packet flow(s) according to the service flow identification information in the flow control message, and steer the identified first packet flow to the computing apparatus 20 according to the service flow steering information in the flow control message. For instance, if the service flow identification information is source physical port information of the first packet flow or logical port information of the first packet flow, the identifying and steering apparatus 30 may determine, according to the physical port information or the logical port information, a packet flow in the received packet flow(s) that is from a physical port indicated by the physical port information or from a logical port indicated by the logical port information as the first packet flow. For another instance, if the service flow identification information is URL information designated to be accessed, the identifying and steering apparatus 30 may determine, according to the URL information, a packet flow in the received packet flow(s) that is used for accessing a webpage indicated by the URL information as the first packet flow. It is illustrated herein that, on specific implementation, the identifying and steering apparatus 30 may be a flow classification module, that is, functionality of the identifying and steering apparatus 30 is implemented with the flow classification module, wherein the flow classification module is primarily used for identifying a packet flow based on layers 1 to 4, and this case is thus primarily applied to a scenario where it is only necessary to identify the packet flow based on layers 1 to 4. Or, the identifying and steering apparatus 30 may include a flow classification module and a deep packet inspection (Deep Packet Inspection, referred to as DPI shortly) module, that is, functionality of the identifying and steering apparatus 30 is implemented with the flow classification module and the DPI module achieve together, wherein the flow classification module is primarily used for identifying a packet flow based on layers 1 to 4, and the DPI is primarily used for identifying a packet flow based on layers 4 to 7, and this case is thus primarily applied to a scenario where it is necessary to perform deep identification on a packet.

Further, in an optional implementation manner, the system for carrying out a service in a network as shown in FIG. 7 includes multiple computing apparatuses 20, that is, multiple instances of the computing apparatus 20 may be actually deployed. Based on this, the orchestrator unit 11 may be further configured to send a computing apparatus selection policy to the second control module 122, so as to enable the second control module 122 to determine a computing apparatus 20 for deploying the first service from the multiple computing apparatuses 20 according to the computing apparatus selection policy. Correspondingly, before controlling the computing apparatus 20 to operate the operation file necessary for deploying the first service, the second control module 122 is further configured to determine the computing apparatus 20 for deploying the first service from multiple computing apparatuses 20 according to the computing apparatus selection policy, wherein one or more computing apparatuses 20 may be determined for deploying the first service.

Optionally, the computing apparatus selection policy may include: a computing apparatus load balance policy, that is, the computing apparatus 20 for deploying the first service is selected with the intent to achieve load balance of the computing apparatuses; a computing apparatus range policy, namely selecting the computing apparatus 20 for deploying the first service from computing apparatuses 20 within a certain range; a computing apparatus priority policy, namely selecting the computing apparatus 20 for deploying the first service from multiple computing apparatuses 20 according to priorities of the computing apparatuses; and a computing apparatus designation policy, namely directly designating one or more computing apparatuses 20 for deploying the first service, and for example, an address, a characteristic or the like of the computing apparatus 20 for deploying the first service may be designated.

It is illustrated herein that, a process of sending the computing apparatus selection policy from the orchestrator unit 11 to the second control module 122 may be the same as, or be separate from, that of sending the second control message from the orchestrator unit 11 to to the second control module 122.

Furthermore, in an optional implementation manner, the system for carrying out a service in a network as shown in FIG. 7 includes multiple identifying and steering apparatuses 30, that is, multiple instances of the identifying and steering apparatus 30 may be actually deployed. Based on this, before sending the flow control message to the identifying and steering apparatus 30, the first control module 121 may be further configured to determine an identifying and steering apparatus 30 for identifying the first packet flow from multiple identifying and steering apparatuses 30, wherein one or more identifying and steering apparatuses 30 may be determined for identifying the first packet flow.

Furthermore, the processing of the first service implemented on the first packet flow may be different in accordance with different services requested to be deployed. Some services may be completed by just performing one service processing on the first packet flow, while some services may be completed by performing multiple service processings on the first packet flow.

For the first service that is completed only by performing multiple service processings, a corresponding first packet flow thereof includes a service chain identifier, wherein the service chain identifier is used for indicating multiple service processings that belong to the first service and are performed on the first packet flow and indicating a sequence of performing the multiple service processings. The service chain identifier may adopt a VLAN label identifier, an MPLS label identifier, or a VN ID identifier in VXLAN; or, a service packet header is encapsulated for an original packet, and the service chain identifier is carried in the service packet header.

Based on the above-mentioned service chain identifier, the control apparatus 10 further sends the service chain identifier to the identifying and steering apparatus 30, and based on the structure as shown in FIG. 7, the service chain identifier may be sent from the first control module 121 of the control apparatus 10 to the identifying and steering apparatus 30. The identifying and steering apparatus 30 further adds the service chain identifier to the identified first packet flow, and steers the first packet flow carrying the service chain identifier to the computing apparatus 20. Under the control of the control apparatus 10, the computing apparatus 20 may specifically operate the operation file necessary for deploying the first service, determine, according to the service chain identifier in the first packet flow, the multiple service processings that belong to the first service and need to be performed on the first packet flow and a sequence of performing the multiple service processings, and then perform the multiple service processings on the first packet flow according to the sequence.

Based on the above-mentioned service chain identifier, in an optional implementation manner, the computing apparatus 20 may be specifically configured to receive the service deployment information sent by the control apparatus 10, and load and operate, according to the service deployment information, multiple service components carried by the operation file necessary for deploying the first service, so as to deploy the first service; receive the first packet flow that is sent by the identifying and steering apparatus 30 and includes the service chain identifier, inquire a service routing table according to the service chain identifier to determine multiple service processing components from the multiple service components and to determine a utilization sequence of the multiple service processing components, wherein the multiple service processing components are service components in the multiple service components that are used for implementing the multiple service processings; and utilize the multiple service processing components to process the first packet flow according to the utilization sequence of the multiple service processing components.

Furthermore, optionally, the inquiring, by the computing apparatus 20, the service routing table according to the service chain identifier to determine multiple service processing components from the multiple service components and to determine a utilization sequence of the multiple service processing components, includes:

inquiring, by the computing apparatus 20, a first service routing table entry according to the service chain identifier and a first ingress port to determine an egress port reaching a first service processing component, wherein the first ingress port is an ingress port receiving the first packet flow, and the first service processing component is used for performing first service processing in the multiple service processings;

steering the first packet flow to the first service processing component;

receiving the first packet flow subjected to the first service processing;

inquiring a second service routing table entry according to a second ingress port to determine an egress port reaching a second service processing component, wherein the second ingress port is an ingress port receiving the first packet flow subjected to the first service processing, and the second service processing component is used for performing second service processing in the multiple service processings; and steering the first packet flow subjected to the first service processing to the second service processing component.

Further, optionally, the inquiring, by the computing apparatus 20, the second service routing table entry according to the second ingress port to determine an egress port reaching the second service processing component, includes:

inquiring, by the computing apparatus 20, the second service routing table entry according to the service chain identifier and the second ingress port to determine the egress port reaching the second service component.

It is illustrated herein that, on specific implementation, the computing apparatus 20 in the respective embodiments of the present invention may be a server device or a circuit board.

It is illustrated herein that, on specific implementation, the control apparatus 10 in the respective embodiments of the present invention may be deployed on a server device.

It is illustrated herein that, on specific implementation, the identifying and steering apparatus 30 in the respective embodiments of the present invention may be deployed on a network device. The network device may be, but is not limited to, a router or an Ethernet switch.

Moreover, the system for carrying out a service in a network provided by the embodiment of the present invention may be deployed on a same device for implementation, or may be deployed on multiple different devices for implementation. That is, the control apparatus 10, the computing apparatus 20 and the identifying and steering apparatus 30 may be deployed on a same device for implementation. Or, the control apparatus 10, the computing apparatus 20 and the identifying and steering apparatus 30 may be deployed on multiple different devices for implementation.

Figure 8:
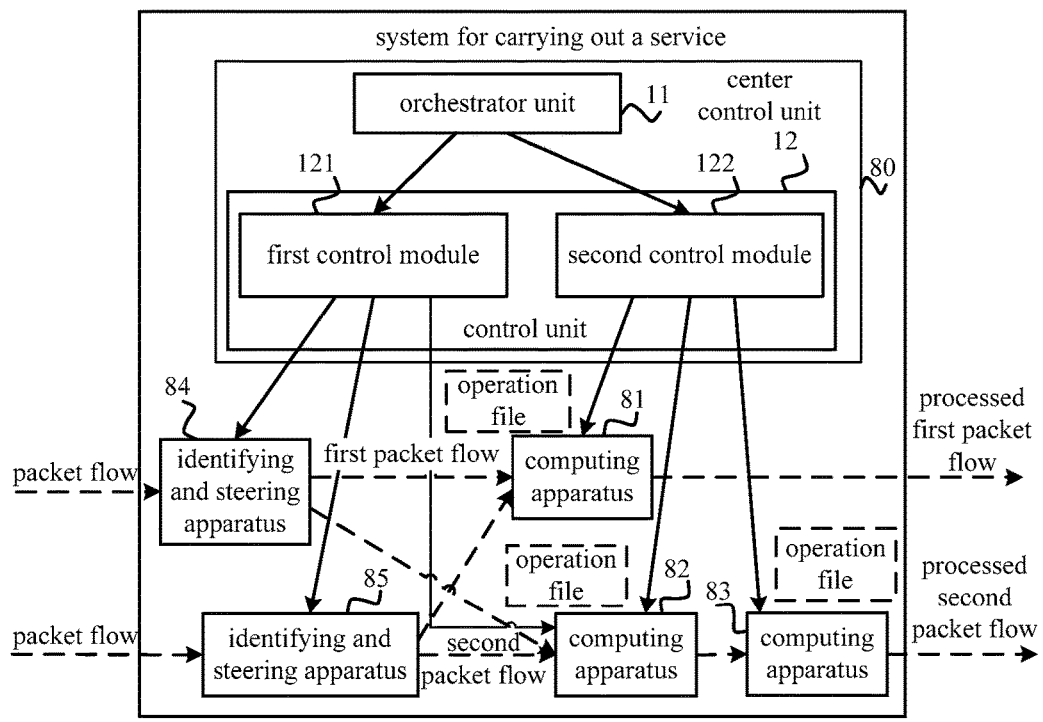
FIG. 8 is a schematic diagram of a structure of another system for carrying out a service in a network provided by an embodiment of the present invention.

Furthermore, in order for persons skilled in the art to understand the system for carrying out a service in a network provided by the embodiment of the present invention more clearly, FIG. 8 shows a system simultaneously including three computing apparatuses and two identifying and steering apparatuses. As shown in FIG. 8, the system includes a control apparatus 80, a computing apparatus 81, a computing apparatus 82, a computing apparatus 83, an identifying and steering apparatus 84 and an identifying and steering apparatus 85, wherein the control apparatus 80 includes an orchestrator unit 11 and a control unit 12, and the control unit 12 includes a first control module 121 and a second control module 122.

The first control module 121 needs to send a flow control message including the service flow identification information and the service flow steering information to each identifying and steering apparatus. The second control module 122 needs to send a load command message including service deployment information to each computing apparatus. In addition, when it is necessary, the first control module 121 further needs to send service routing information to the computing apparatuses. The foregoing embodiments may be referred to for the descriptions of other functions of the modules or units as shown in FIG. 8, which will not be described redundantly herein.

By taking the structure shown in FIG. 8 as an example, a service processing process needing to be completed by performing multiple service processings on a packet flow is simply illustrated below.

It is assumed that, in FIG. 8, the identifying and steering apparatuses 84 and 85 simultaneously receive packet flows and perform service identification, the identifying and steering apparatuses 84 and 85 respectively send packets belonging to the first packet flow to the computing apparatus 81, and the computing apparatus 81 sends a processed first packet flow to the network after processing the packets belonging to the first packet flow.

In the present embodiment, it is assumed that multiple service processings needs to be performed on a second packet flow. The identifying and steering apparatuses 84 and 85 identify a packet belonging to the second packet flow. Since multiple service processings need to be performed on the second packet flow, the second packet flow has a service chain identifier. The identifying and steering apparatuses 84 and 85 add the service chain identifier to a packet belonging to the second packet flow and then send the packet to the computing apparatus 82. The computing apparatus 82 may identify the service chain identifier, and utilize the multiple service processings to process the second packet flow according to a sequence of performing the multiple service processings indicated by the service chain identifier and to the service routing information (may be specifically obtained by inquiring a routing table) sent by the first control module 121. Finally, the computing apparatus 82 outputs the processed second packet flow to the computing apparatus 83. The computing apparatus 83 completes final processing on the second packet flow and sends the processed second packet flow to the network.

Similarly, in FIG. 8, a solid line with an arrow denotes a control flow, and a dotted line with an arrow denotes a packet flow.

In an optional implementation manner, considering that a bandwidth network gateway (BNG) device is generally located in a metropolitan area network, which belongs to a margin of an IP network, and is closer to a user than any IDC without being limited by an outlet bandwidth of the metropolitan area network. Therefore, it is more beneficial to reduce an occurrence of conditions such as stagnation and wait in a process of carrying out an OTT application for a user. Hence, the system for carrying out a service in a network provided by the embodiment of the present invention may be deployed in a network composed of BNG devices.

Along with virtualization of network functionality, the network composed of BNG devices provided by the embodiment will contain standardization information technology (Information Technology, referred to as IT shortly) servers. These IT servers are deployed together with the BNG devices, or are deployed in a same metropolitan area/zone with the BNG devices. A BNG device generally represents a router added with an access control functionality, and a server primarily includes a functionality such as access control, routing control and/or the like. This kind of novel network or system that is composed of BNG devices and includes standard servers is collectively referred to as a soft BNG (softBNG) system in the embodiment of the present invention.

Figure 9:
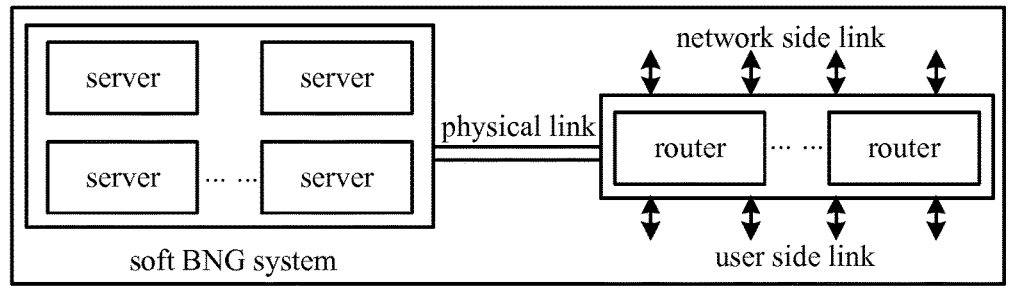
FIG. 9 is a schematic diagram of a structure of a softBNG system provided by an embodiment of the present invention.

As shown in FIG. 9, a composition of a softBNG system includes one or more routers and one or more servers. The router in FIG. 9 may be served as the above-mentioned BNG device, wherein the server may be connected to the router via a physical link or a logic pipeline. FIG. 9 shows a situation that the server is connected to the router via a physical link. The logic pipeline includes, but is not limited to, an MPLS tunnel, a generic routing encapsulation (Generic Routing Encapsulation, referred to as GRE shortly)

tunnel or a path defined by a same VLAN in the Ethernet. The router is connected to an network link to the external. The network link includes a user side link and a network side link, and is used for implementing network intercommunication and quick forwarding of a packet flow. The server implements some complicated logic controls, such as, for example, access control functionality, routing control functionality, etc. Based on the softBNG system shown in FIG. 9, the above-mentioned control apparatus 10 may be deployed on the server, the computing apparatus 20 may be deployed on the server, and the identifying and steering apparatus 30 may be deployed on the router.

Functionality of the system for carrying out a service in a network provided by the embodiment of the present invention is further illustrated below in conjunction with a specific application scenario and the softBNG system shown in FIG. 9.

A network disk service, also known as a network disk OTT, is an internet application in which a user accesses a certain network disk webpage through the internet, uploads his/her own file, or downloads his/her own file or a file shared by other person, and replaces a memory on an individual device of the user with the memory in the network. Such OTT service may provide convenience to a user for backup of an important file, file sharing, carrying of a remote file and the like.

Due to a limited OTT access bandwidth of a network operator and a network disk OTT center, a large number of downloads would crowd the OTT access bandwidth, and a large amount of other uploads and downloads would be influenced by the crowded OTT access bandwidth, therefore, user experience of current network disk service is not satisfied. In addition, a limited bandwidth of a user access side line would also reduce user experience.

By adopting the system for carrying out a service in a network provided by the embodiment of the present invention, network disk service may be accelerated to improve user experience. Specifically, by adopting API capability as well as capability of supporting loading and operating a service component and the like that are provided by the system (i.e., the softBNG system) for carrying out a service in the network provided by the embodiment of the present invention, a network disk OTT control center dynamically loads a virtual service component (may be referred to as a network disk helper (helper)) in the computing apparatus. The virtual service component refers to a service component implemented in a form of a virtual machine. Serving as an upload server of a user, the network disk helper interacts with the network disk OTT control center, firstly completes confirmation on an upload of the user, and then transmits a file uploaded by the user to the network disk OTT center in the background. Since network disk helpers are distributed in the metropolitan area network of a city where the user is located, and are not limited by an OTT access bandwidth agreed by the network disk OTT control center and an operator, upload speed of a user will be greatly accelerated. Background transfer may avoid Internet peak, hence bandwidth pressure of the network disk OTT control center may be also reduced. In addition, by operating a system for carrying out a service in a network such as the softBNG, an operator sells a service platform instead of selling a bandwidth, and profits are acquired by attracting a large amount of OTT applications to use the service platform; meanwhile, investment in a core network bandwidth may also be reduced.

Figure 10:
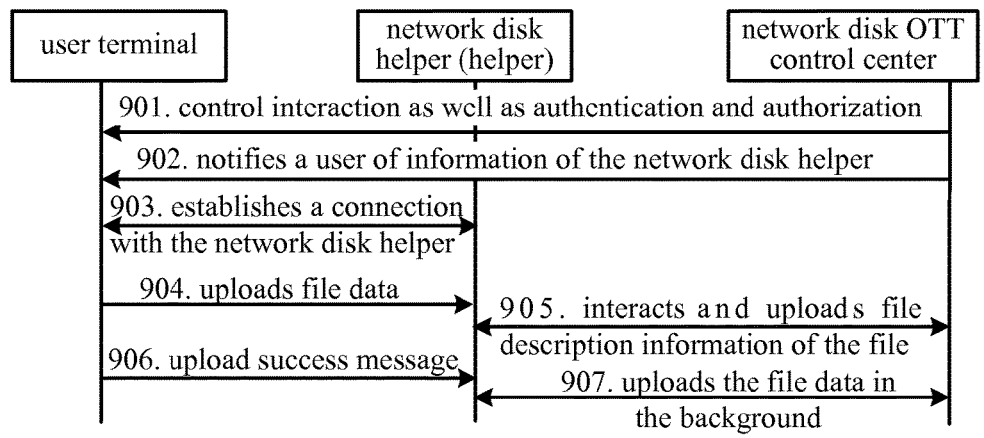
FIG. 10 is a flowchart of an upload based on a network disk helper provided by an embodiment of the present invention.

For instance, as shown in FIG. 10, an upload flow based on the network disk helper for a user includes the following steps.

901. a user terminal performs control interaction as well as authentication and authorization with a network disk OTT control center.

902. The network disk OTT control center notifies a user of information of a network disk helper.

903. The user terminal establishes a connection with the network disk helper.

904. The user terminal uploads file data to the network disk helper. It may take a plurality of times for the user terminal to upload the file data to the network disk helper.

905. The network disk helper interacts with the network disk OTT control center to upload file description information of the file.

906. The network disk helper returns an upload success message to the user terminal.

907. The network disk helper uploads the file data to the network disk OTT control center in the background.

It is illustrated below how to load the network disk helper to the softBNG system and establish the above-mentioned service flow. It is assumed that the network disk OTT is dbank.

At first, a dbank control center accesses an API provided by the softBNG system. For example, the access may be performed by adopting the following API message:

```
<?xml version="1.0" encoding="UTF-8"?>
<VirtualAppliance >
<name>dbank-helper</name>
<loadFile>http://dbank.com/remoteVMF/debank-helper.img</loadFile>
<virtual-env>XEN Express</virtual-env>
<cpu>800MHz</cpu>
<mem>1G</mem>
<storage>300G</storage>
<bandwidth>500Mbps</bandwidth>
</ VirtualAppliance >
<pathes>
<entry>
<match>
<protocol>HTTP|HTTPS</protocol>
<url>*.dbank.com/*</url>
</match>
<action>
<gotopath>dbank-path</gotopath>
</action>
</entry>
<path>
<name>dbank-path</name>
<VirtualAppliance >dbank-helper</ VirtualAppliance >
</path>
</pathes>
```

The above API message adopts an extensible markup language (Extensible Markup Language, referred to as XML shortly) format, primarily defines a virtual service component dbank-helper, and a central processing unit (Central Processing Unit, referred to as CPU shortly), a memory, a storage and requirements on network interface bandwidth of the virtual service component, and specifies a position of an operation file of the dbank-helper, equivalent to specifying path information of the operation file of the dbank-helper.

In addition, the above-mentioned API message in the XML format also defines a service flow path (label <pathes></pathes>), including service flow identification information (label <entry></entry>) and service flow steering information (label <action></action>), wherein the service flow steering information is used for indicating that a packet flow is to be sent to a path defined by dbank-path, and the path is defined hereinafter and is used for indicating that the packet flow is to be sent to a virtual service component dbank-helper.

Figure 11:
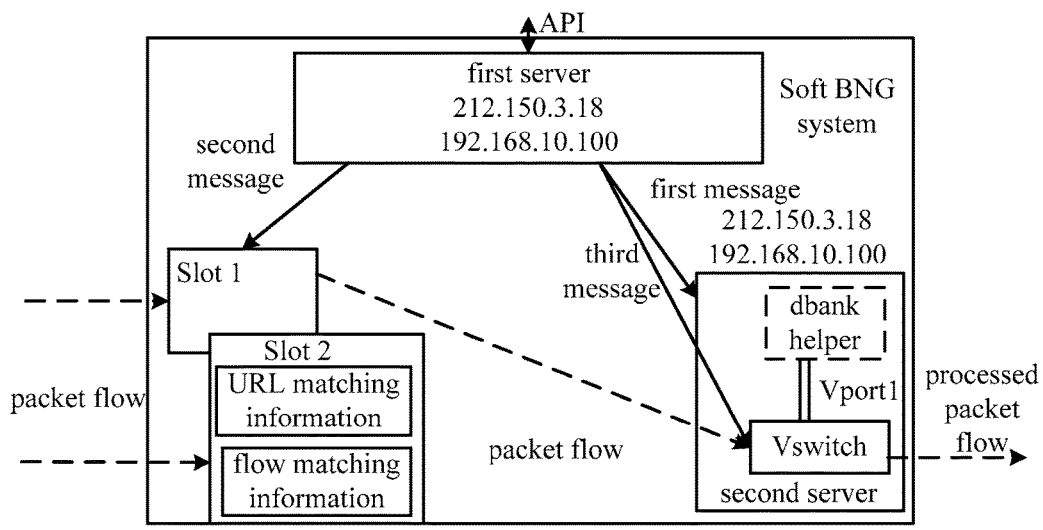
FIG. 11 is a schematic diagram of a structure of a softBNG system provided by an embodiment of the present invention while implementing a network disk service.

FIG. 11 is a schematic diagram of a structure of a softBNG system provided by an embodiment of the present invention while implementing a network disk service. As shown in FIG. 11, a control apparatus is deployed on a first server and is responsible for processing the above-mentioned API message (equivalent to the service request in the foregoing embodiments); a computing apparatus is deployed on a second server; and an identifying and steering apparatus is deployed on two circuit boards of a first router.

Specifically, based on service deployment information, namely, label <VirtualAppliance> in the API message, and by utilizing cpu/mem/storage/bandwidth and the like specified therein, the first server selects one computing apparatus to serve as the computing apparatus. It is assumed that the selected computing apparatus is deployed on the second server, and the second server adopts an XEN virtual machine environment.

The first server sends position information (i.e., contents of the lable <loadFile>) of an operation file of the dbank-helper in the service deployment information to the second server through a first message (equivalent to the load command message in the above-mentioned embodiment), and the second server loads the virtual service component dbank-helper based on the first message, wherein a process of loading the dbank-helper belongs to a one-time loading process, that is, establishment of a new virtual machine carrying the dbank-helper and loading and operating of the dbank-helper in the new virtual machine are simultaneously completed, and a virtual network card of the new virtual machine is connected to one port vport1 of a virtual switch Vswitch within the second server. After the loading is completed, the virtual service component dbank-helper starts to operate. The second server returns an identifier of the virtual machine and port information of the Vswitch connected to the virtual network card to the first server.

The first server sends a second message (equivalent to the flow control message in the above-mentioned embodiment) to the first router. The first router has two circuit boards, which are respectively referred to as slot1 and slot2. One identifying and steering apparatus is implemented on each of the two circuit boards. In the present embodiment, the identifying and steering apparatus includes a flow classification module and a DPI module. In the present embodiment, the flow classification module completes inspection of a hypertext transfer protocol (Hypertext Transfer Protocol, referred to as HTTP shortly)/secure hypertext transfer protocol (Secure Hypertext Transfer Protocol, referred to as HTTPS shortly) packet, and then sends the inspected HTTP/HTTPS packet to the DPI module. The DPI module completes a URL matching functionality. In other cases, the identifying and steering apparatus may be completed singly by the flow classification module. The second message includes following flow matching information and URL matching information:

flow matching information: Match: TCP/80, TCP/8080 Action: forward to URL match; and URL matching information: match: *.dbank.com/* Action: forward to path 'dbank-path', ip: 192.168.10.110.

The service flow identification information herein refers to Match: TCP/80, TCP/8080, and match: *.dbank.com/*.

The service flow steering information herein refers to Action: forward to path 'dbank-path', ip: 192.168.10.110.

The above-mentioned flow matching information and the above-mentioned URL matching information are obtained by disassembling the above API message to adapt to an implementation layer, or may be implemented in other manner. It can be seen from the above that, the second message primarily includes the service flow identification information and the service flow steering information. The service flow steering information herein is expressed by a service flow path, and may also directly indicate an internal address of the dbank-helper, namely 192.168.10.110.

After receiving the second message, the first router obtains the flow matching information and the URL matching information from the second message, configures the two pieces of information into slot1, and configures the two pieces of information into slot2. Optionally, the flow matching information may be configured into a flowtable (flowtable) module.

The two slots on the first router receives a packet flow from an external port, firstly identify, by adopting the flow matching information previously configured, a packet with a protocol as a transmission control protocol (Transmission Control Protocol, referred to as TCP shortly) and a target port as 80 and 8080 ports (a packet with a port as 80 represents an HTTP packet and a packet with a port as 8080 represents an HTTPS packet), and perform matching processing on such packet according to the URL matching information previously configured. After a URL request packet matching a character string mode of "*.dbank.com/*" is found, the two slots add a packet header to the URL request packet, and send the URL request packet carrying information "path: dbank-path, in: entry" to the address 192.168.10.110.

In the present embodiment, the first server further sends a third message (equivalent to the service routing information sent in the above-mentioned embodiment) to a Vswtich of the second server. In the present embodiment, the Vswtich is deployed with the service determining unit in the above-mentioned embodiment. The third message, i.e., the above-mentioned service routing information, may include the following two pieces of routing information:

first routing (route entry) information: Path: dbank-path, in: entry, nextpath: null target:vport1; and second routing (route entry) information: Path: null, in:vport1 nextpath: null target: normal forward.

The service determining unit in the Vswtich receives a packet carrying path information, matches path/source port information according to the first routing information, and performs an action indicated by the nextpath and target. For instance, in the present example, the service determining unit in the Vswtich matches a packet to the path: dbank-path, in:entry, wherein in:entry represents that the packet is directly from the identifying and steering apparatus; nextpath: null represents that a added packet header is removed; target represents a sending target, and the sending target is the port vport1 in the present example. Based on the first routing information, the service determining unit located at the Vswtich removes a service packet header, and then sends the packet to the vport1 of Vswitch, namely sending to the virtual service component where the dbank-helper is located. It is illustrated herein that, after receiving the above-mentioned two pieces of routing information, the second server may store the above-mentioned two pieces of routing information in corresponding service routing tables. Based on this, the service determining unit in the Vswtich may obtain corresponding routing information by inquiring a corresponding service routing table.

The packet sent by the dbank-helper will be matched to path:null,in:vport1, i.e., the second routing information. Since the dbank-helper has no subsequent processing in the present example, normal forwarding is just required, so the nextpath: null represents that it is not necessary to add a service chain identifier, and target: normal forward represents that normal network packet forwarding is performed according to a target address of a network packet header.

If the dbank-helper still has a subsequent service component Y which needs to continue to process the network flow packet, the nextpath needs to be specified as nextpath: dbank-path, target: Y, and such table entry is set in the Vswitch by the control apparatus (may be specifically the orchestrator unit and the first control module in the control apparatus), so as for indicating that a packet is to be transferred from the service determining unit to a next service component.

The above-mentioned two pieces of routing information are a specific implementation manner of sequentially steering a packet flow to the respective service components for processing in the case that the service chain identifier indicates that the packet flow is to be sequentially processed by the multiple service components, and the above-mentioned two pieces of routing information indicate how the Vswitch processes the dbank packet flow. The first routing information indites that, for a packet that is sent from entry and carries a dbank-path mark, a path packet header is to be removed and the packet is then to be forwarded to the vport1. The second routing information indicates that, for a packet sent from the port vport1, a path packet header is not to be added and the packet is to be forwarded in a standard manner. It is merely a schematic illustration that sequentially steering the packet flow to the respective service components for processing is implemented through the two pieces of routing information herein. In practice, simpler information coding may be adopted to implement the service chain identifier and achieve a same purpose.

Based on the above-mentioned two pieces of routing information, the Vswitch located at the second server may correctly send packets sent by the two slots of the first router to the dbank-helper, and may further continue to forward the packet processed by the dbank-helper through IP to a dbank control center.

It is illustrated herein that, the dbank-helper may has its own external address, such as, for example, 212.150.5.147, and the dbank-helper may directly communicate with the outside by adopting the external address. For packets with target addresses directing to the dbank control center, corresponding to step 901, the dbank-helper may add its own external address to these packets, so as to enable the dbank control center to positioning the dbank-helper conveniently, thereby implementing the flow shown in FIG. 10. The dbank-helper may obtain a packet accessing a target address directing to the dbank control center through the service chain implementation mechanism mentioned in the present document. The external address of the dbank-helper may be configured by the first server (i.e., the control apparatus).

Therefore, the system for carrying out a service in a network provided by the embodiment of the present invention actually provides a system architecture capable of implementing online service programming, and implementation the system architecture is helpful for joint of dynamic injection of various services (such as, for example, OTT applications) and network flow, thereby providing a new service mode. Based on this, the operator may operate a service platform similar to the softBNG system based on such service mode, and charge through utilization of the service platform, thereby introducing a new profit manner.

Figure 12:
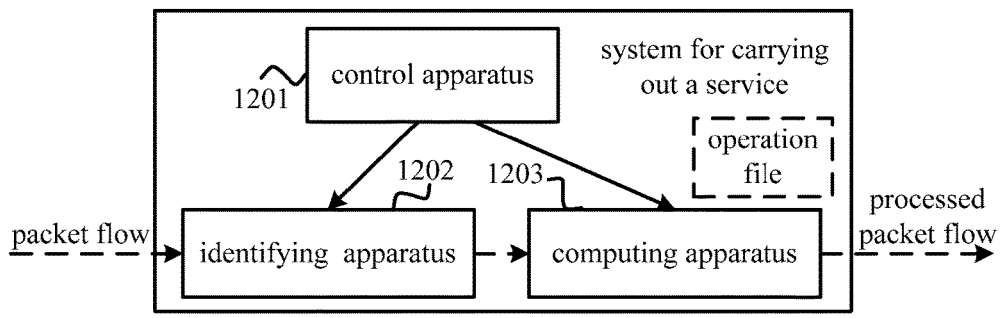
FIG. 12 is a schematic diagram of a structure of another system for carrying out a service in a network provided by an embodiment of the present invention.

FIG. 12 is a schematic diagram of a structure of another system for carrying out a service in a network provided by an embodiment of the present invention. As shown in FIG. 12, the system includes a control apparatus 1201, an identification apparatus 1202 and a computing apparatus 1203.

The control apparatus 1201 is configured to receive a service request for requesting to carry out a service, wherein the service request includes service deployment information for requesting to deploy a first service and service flow identification information for identifying a first packet flow.

The identification apparatus 1202 is configured to identify the first packet flow from received packet flow according to the service flow identification information received by the control apparatus 1201.

The computing apparatus 1203 is configured to operate, according to the service deployment information received by the control apparatus 1201, an operation file necessary for deploying the first service, so as to deploy the first service, and perform processing of a first service on the identified first packet flow after the first service is deployed.

A dotted line with an arrow in FIG. 12 denotes a packet flow direction.

The service deployment information may include address information of the operation file necessary for deploying the first service, but is not limited hereto. For example, the service deployment information may further include some other information related to the first service to be deployed, such as, for example, user information, service characteristic information, etc. Optionally, the address information of the operation file necessary for deploying the first service may be path information for accessing the operation file and filename information of the operation file, or may be URL information directing to the operation file, etc.

The above-mentioned service flow identification information is primarily used for indicating a packet flow needing to be identified. In the present embodiment, the packet flow needing to be identified is a packet flow of the first service needing to be deployed. To simplify the description, in the embodiment of the present invention, a packet flow of the first service is referred to as the first packet flow, and correspondingly, the above-mentioned service flow identification information is primarily used for indicating the first packet flow needing to be identified.

The service flow identification information may include, but is not limited to, at least one of the following: information on a physical port receiving the first packet flow (i.e., source physical port information of the first packet flow), information on a logical port receiving the first packet flow (i.e., source logical port information of the first packet flow), URL information accessed by the first packet flow, as well as a source IP address, a target IP address, source transmission layer port information and target transmission layer port information of the first packet flow.

In the present embodiment, the control apparatus 1201, on one hand, provides an API to the external, and the term "to the external" refers to a device or a person requesting to deploy the first service. For example, the control apparatus 1201 may provide an API to an administrator, or may provide an API to an OTT application server, etc. The API is primarily used for implementing two functions: one is to provide address information of the operation file necessary for deploying the first service; and the other is to provide information for identifying the first packet flow, i.e., the service flow identification information. The two primary functions of the API may be implemented by the above-mentioned service request, that is, the service deployment information and the service flow identification information are carried in the service request.

It is illustrated herein that, the above-mentioned service request may be carried by one API message, or may be carried by two or more API messages. Correspondingly, the service deployment information and the service flow identification information may be carried in one API message or carried in two or more API messages.

Furthermore, processing of the first service performed on the first packet flow is different in accordance with different services requested to be deployed. Some services may be completed by just performing one service processing on the first packet flow, while some services may be completed by performing multiple service processings on the first packet flow.

In an optional implementation manner, the identification apparatus 1202 is further configured to add a service chain identifier to the first packet flow, wherein the service chain identifier is used for indicating multiple service processings that belong to the first service and are performed on the first packet flow and indicating a sequence of performing the multiple service processings. Based on this, the computing apparatus 1203 may be specifically configured to load and operate multiple service components for deploying the first service, so as to deploy the first service; according to the service chain identifier, determine multiple service processings that belong to the first service and need to be performed on the first packet flow and determine a sequence of performing the multiple service processings; and perform the multiple service processings on the first packet flow according to the sequence.

The service chain identifier may adopt a VLAN label identifier, an MPLS label identifier, or a VN ID identifier in VXLAN; or, a service packet header is encapsulated for an original packet, and the service chain identifier is carried in the service packet header.

Further, optionally, the determining, by the computing apparatus 1203, the multiple service processings that belong to the first service and need to be performed on the first packet flow, and determining the sequence of performing the multiple service processings according to the service chain identifier, includes that.

The computing apparatus 1203 is specifically configured to: inquire, according to the service chain identifier, a service routing table to determine multiple service processing components from the multiple service components and a utilization sequence of the multiple service processing components, wherein the multiple service processing components are service components in the multiple service components that are used for implementing the multiple service processings; and utilize the multiple service processing components to process the first packet flow according to the utilization sequence of the multiple service processing components.

On implementation, the respective apparatuses of the system provided by the present embodiment may be deployed on a same device.

In the system provided by the present embodiment, the control apparatus receives the service request for requesting to carry out the service, the computing apparatus operates the operation file necessary for deploying the first service, the identifying and steering apparatus identifies the first packet flow and steers the first packet flow to the computing apparatus, and the computing apparatus deployed with the first service performs processing of the first service on the first packet flow, thereby implementing carrying out of the first service, allowing a related operation file to be loaded and operated only when a service is deployed, and providing an open service mode allowing an operator to deviate from a device manufacturer and develop a new service functionality, which in turn may reduce an amount of time necessary for carrying out a new service functionality and meet rapid developing needs of OTT applications.

Figure 13:
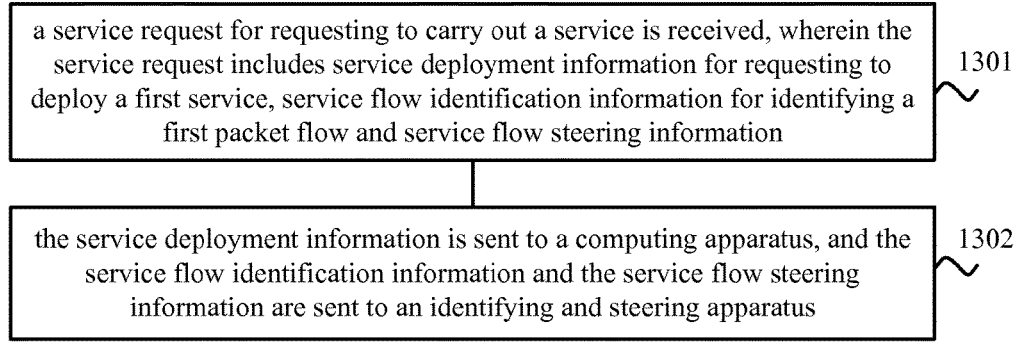
FIG. 13 is a flowchart of a method for carrying out a service in a network provided by an embodiment of the present invention.

FIG. 13 is a flowchart of a method for carrying out a service in a network provided by an embodiment of the present invention. As shown in FIG. 13, the method includes the following steps.

1301. A service request for requesting to carry out a service is received, wherein the service request includes service deployment information for requesting to deploy a first service, service flow identification information for identifying a first packet flow and service flow steering information.

1302. The service deployment information is sent to a computing apparatus, and the service flow identification information and the service flow steering information are sent to an identifying and steering apparatus.

Optionally, step 1302 includes: sending a load command message to the computing apparatus, and sending a flow control message to the identifying and steering apparatus, wherein the load command message includes the service deployment information, and the flow control message includes the service flow identification information and the service flow steering information.

The service deployment information may include address information of an operation file necessary for deploying the first service, but is not limited hereto. For instance, the service deployment information may further include some other information related to the first service to be deployed, such as, for example, user information, service characteristic information, etc. Optionally, the address information of the operation file necessary for deploying the first service may be path information for accessing the operation file and filename information of the operation file, or may be URL information directing to the operation file, etc.

The above-mentioned service flow identification information is primarily used for indicating a packet flow needing to be identified. In the present embodiment, the packet flow needing to be identified is a packet flow of the first service needing to be deployed. To simplify the description, in the embodiment of the present invention, a packet flow of the first service is referred to as a first packet flow, and correspondingly, the above-mentioned service flow identification information is primarily used for indicating the first packet flow needing to be identified.

The service flow identification information may include, but is not limited to, at least one of the following: information on a physical port receiving the first packet flow (i.e., source physical port information of the first packet flow), information on a logical port receiving the first packet flow (i.e., source logical port information of the first packet flow), URL information accessed by the first packet flow, as well as a source IP address, a target IP address, source transmission layer port information and target transmission layer port information of the first packet flow.

The above-mentioned service flow steering information is primarily used for indicating that the first packet flow is to be steered to the computing apparatus responsible for deploying the first service.

The service flow steering information includes, but is not limited to, at least one of the following: an IP address of the computing apparatus, port information of the computing apparatus and identification information of the operation file, such as, for example, filename information, etc.

After receiving the service flow identification information and the service flow steering information, the identifying and steering apparatus identifies the first packet flow from received packet flow according to the service flow identification information, and steers the identified first packet flow to the computing apparatus according to the service flow steering information. After receiving the service deployment information, the computing apparatus operates the operation file necessary for deploying the first service according to the service deployment information, so as to deploy the first service, and performs processing of the first service on the first packet flow sent by the identifying and steering apparatus.

Figure 14:
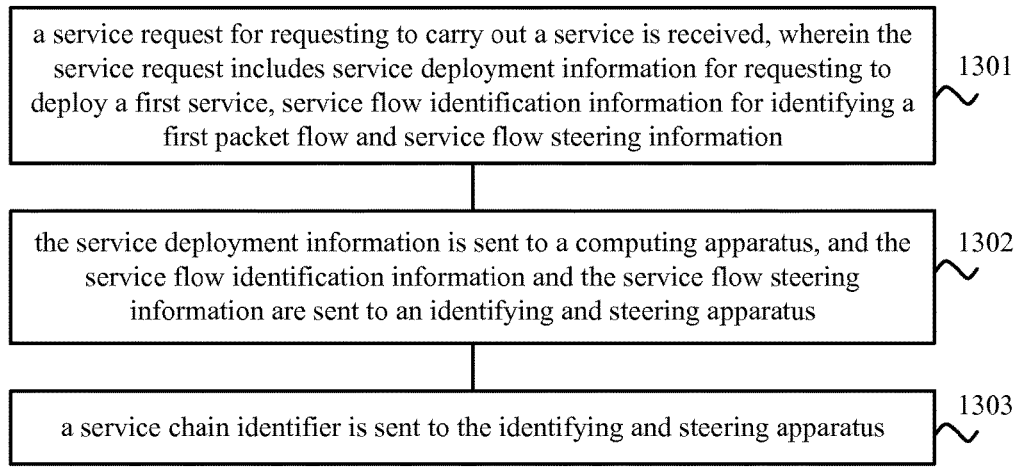
FIG. 14 is a flowchart of another method for carrying out a service in a network provided by an embodiment of the present invention.

In an optional implementation manner, the first packet flow may need to be subjected to multiple service processings. As shown in FIG. 14, the method further includes the following step.

1303. a service chain identifier is sent to the identifying and steering apparatus.

The service chain identifier is used for indicating multiple service processings that belong to the first service and are performed on the first packet flow and indicating a sequence of performing the multiple service processings. On implementation, the service chain identifier may be a VLAN label, an MPLS label, a VNI in VXLAN encapsulation, or be carried in an information field added beyond an original packet.

Based on this, the identifying and steering apparatus sends the service chain identifier to the computing apparatus by adding the service chain identifier to the first packet flow. The computing apparatus obtains the service chain identifier from the first packet flow, determines, according to the service chain identifier, multiple service processings that belong to the first service and need to be performed on the first packet flow and a sequence of performing the multiple service processings, and performs the multiple service processings on the first packet flow according to the sequence.

It is illustrated herein that, a sequence of above-mentioned step 1302 and step 1303 is not limited. The two steps may be performed simultaneously.

Furthermore, the method further includes: sending a resource adjustment message to the computing apparatus, wherein the resource adjustment message includes information of resource needing to be occupied currently by the operation file necessary for deploying the first service.

The method flow for carrying out a service in a network provided by the embodiment may be implemented by the control apparatus as shown in FIG. 1 or FIG. 2 in the above-mentioned embodiment, which will not be described redundantly herein.

The method in the present embodiment provides an open service mode, which allows an operator to deviate from a device manufacturer and develop a new service functionality, thereby reducing an amount of time necessary for carrying out a new service functionality, and meeting rapid developing needs of OTT applications.

Figure 15:
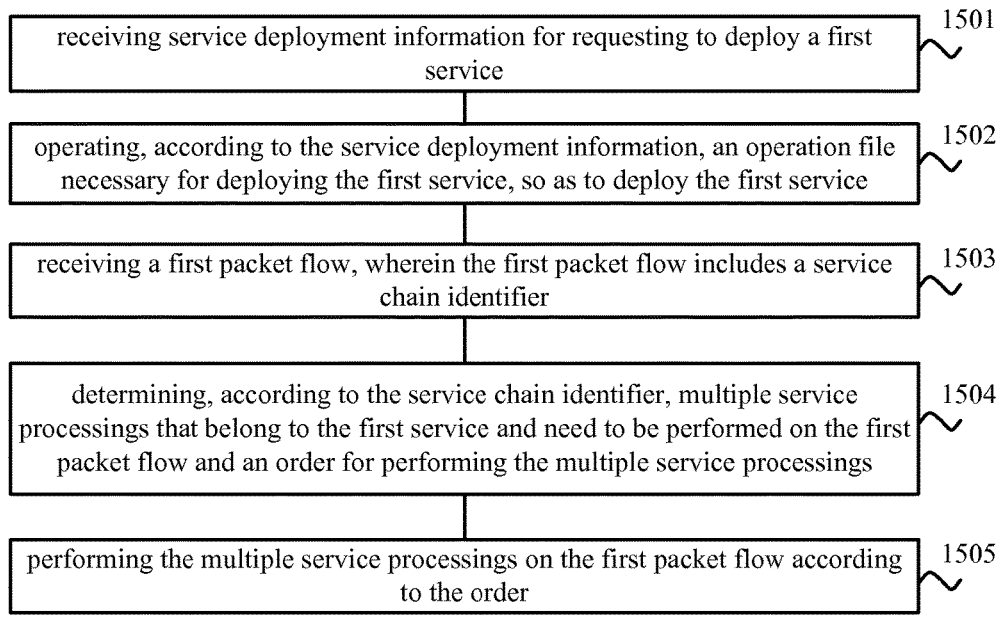
FIG. 15 is a flowchart of another method for carrying out a service in a network provided by an embodiment of the present invention.

FIG. 15 is a flowchart of another method for carrying out a service in a network provided by an embodiment of the present invention. As shown in FIG. 15, the method includes:

1501. receiving service deployment information for requesting to deploy a first service;

1502. operating, according to the service deployment information, an operation file necessary for deploying the first service, so as to deploy the first service;

1503. receiving a first packet flow, wherein the first packet flow includes a service chain identifier;

1504. determining, according to the service chain identifier, multiple service processings that belong to the first service and need to be performed on the first packet flow and a sequence of performing the multiple service processings; and 1505. performing the multiple service processings on the first packet flow according to the sequence.

In an optional implementation manner, step 1502, namely, operating, according to the service deployment information, an operation file necessary for deploying the first service, so as to deploy the first service, includes:

loading and operating, according to the service deployment information, multiple service components for deploying the first service, so as to deploy the first service, wherein the multiple service components are carried by the operation file necessary for deploying the first service.

Correspondingly, step 1504, namely, determining, according to the service chain identifier, multiple service processings that belong to the first service and need to be performed on the first packet flow and a sequence of performing the multiple service processings, includes:

inquiring a service routing table according to the service chain identifier to determine multiple service processing components from the multiple service components and a utilization sequence of the multiple service processing components, the multiple service processing components being service components in the multiple service components that are used for implementing the multiple service processings; and the performing the multiple service processings on the first packet flow according to the sequence, includes:

utilizing the multiple service processing components to process the first packet flow according to the utilization sequence of the multiple service processing components.

Moreover, optionally, the multiple service processing components include two service processing components, which are respectively a first service processing component and a second service processing component. Correspondingly, the multiple service processings include two service processings. Based on this, the above-mentioned inquiring the service routing table according to the service chain identifier to determine multiple service processing components from the multiple service components and the utilization sequence of the multiple service processing components, includes:

inquiring a first service routing table entry according to the service chain identifier and a first ingress port to determine an egress port reaching a first service processing component, wherein the first ingress port is an ingress port receiving the first packet flow, and the first service processing component is used for performing first service processing in the multiple service processings;

steering the first packet flow to the first service processing component;

receiving the first packet flow subjected to the first service processing;

inquiring a second service routing table entry according to a second ingress port to determine an egress port reaching a second service processing component, wherein the second ingress port is an ingress port receiving the first packet flow subjected to the first service processing, and the second service processing component is used for performing second service processing in the multiple service processings; and steering the first packet flow subjected to the first service processing to the second service processing component.

Further, optionally, the inquiring the second service routing table entry according to the second ingress port to determine the egress port reaching the second service processing component, includes:

inquiring, according to the service chain identifier and the second ingress port, the second service routing table entry to determine the egress port reaching the second service component.

The method provided by the embodiment may be implemented by the computing apparatus as shown in FIG. 3, which will not be described in detail.

In an optional implementation manner, the method further includes:

receiving a resource adjustment message, wherein the resource adjustment message comprises information of resource needing to be occupied currently by the operation file; and adjusting resource occupied by the operation file according to the resource adjustment message.

In the present embodiment, the service deployment information may include address information of an operation file necessary for deploying the first service, but is not limited hereto. For instance, the service deployment information may further include some other information related to the first service to be deployed, such as, for example, user information, service characteristic information, etc. Optionally, the address information of the operation file necessary for deploying the first service may be path information for accessing the operation file and filename information of the operation file, or may be URL information directing to the operation file, etc.

The method in the present embodiment provides an open service mode, which allows an operator to deviate from equipment manufacturers and develop a new service functionality, thereby reducing an amount of time required for carrying out a new service functionality and meeting rapid developing needs of OTT applications.

Figure 16:
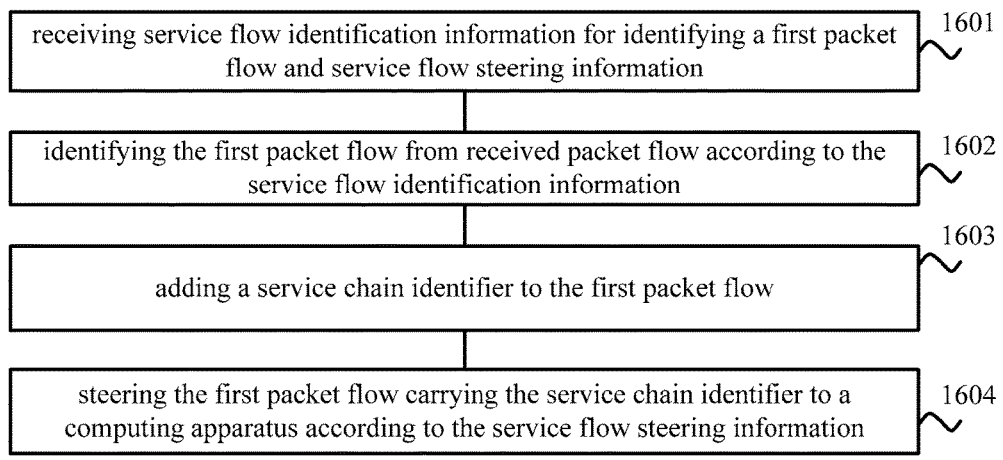
FIG. 16 is a flowchart of another method for carrying out a service in a network provided by an embodiment of the present invention.

FIG. 16 is a flowchart of another method for carrying out a service in a network provided by an embodiment of the present invention. As shown in FIG. 16, the method includes:

1601. receiving service flow identification information for identifying a first packet flow and service flow steering information;

1602. identifying the first packet flow from received packet flow according to the service flow identification information;

1603. adding a service chain identifier to the first packet flow; and

1604. steering the first packet flow carrying the service chain identifier to a computing apparatus according to the service flow steering information.

The method provided by the embodiment may be implemented by the identifying and steering apparatus as shown in FIG. 4, which will not be described in detail.

The above-mentioned service flow steering information includes at least one of the following:

an internet protocol (IP) address of the computing apparatus, port information of the computing apparatus, and identification information of an operation file necessary for deploying the first service.

The method in the present embodiment provides an open service mode, which allows an operator to deviate from equipment manufacturers and develop a new service functionality, thereby reducing an amount of time required for carrying out a new service functionality and meeting rapid developing needs of OTT applications.

Figure 17:
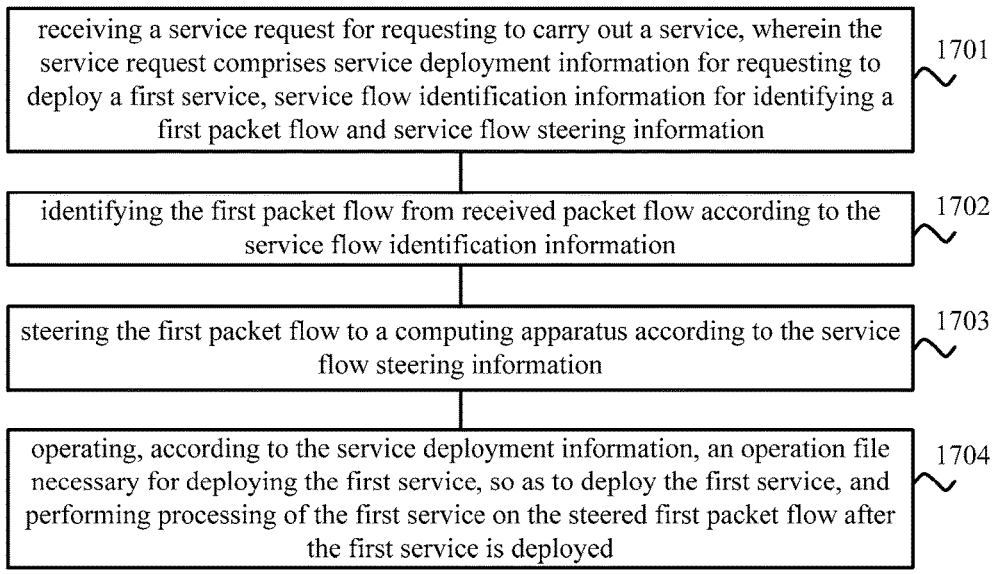
FIG. 17 is a flowchart of another method for carrying out a service in a network provided by an embodiment of the present invention.

FIG. 17 is a flowchart of another method for carrying out a service in a network provided by an embodiment of the present invention. As shown in FIG. 17, the method includes:

1701. receiving a service request for requesting to carry out a service, wherein the service request comprises service deployment information for requesting to deploy a first service, service flow identification information for identifying a first packet flow and service flow steering information;

1702. identifying the first packet flow from received packet flow according to the service flow identification information;

1703. steering the first packet flow to a computing apparatus according to the service flow steering information; and

1704. operating, according to the service deployment information, an operation file necessary for deploying the first service, so as to deploy the first service, and performing processing of the first service on the steered first packet flow after the first service is deployed.

The method provided by the present embodiment may be implemented by the system for carrying out a service in the network as shown in FIG. 5, which will not be described redundantly herein.

The method in the present embodiment provides an open service mode, which allows an operator to deviate from equipment manufacturers and develop a new service functionality, thereby reducing an amount of time required for carrying out a new service functionality and meeting rapid developing needs of OTT applications.

Figure 18:
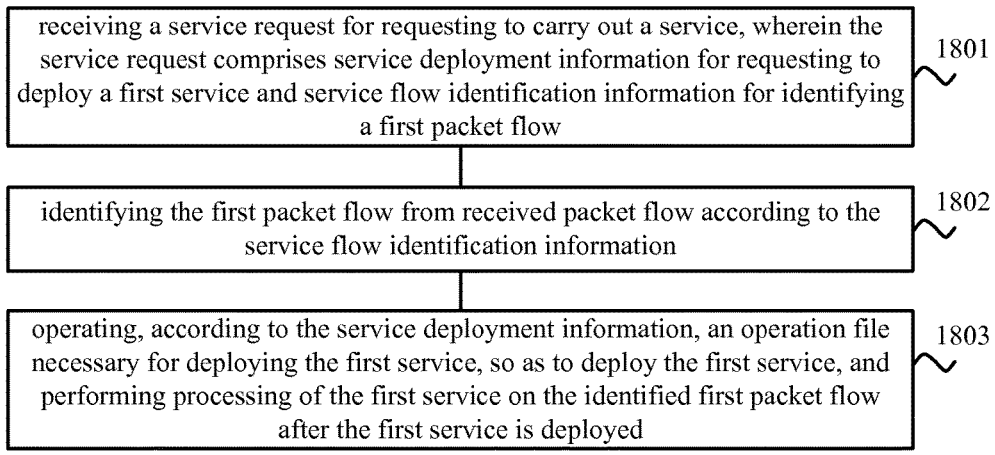
FIG. 18 is a flowchart of another method for carrying out a service in a network provided by an embodiment of the present invention.

FIG. 18 is a flowchart of another method for carrying out a service in a network provided by an embodiment of the present invention. As shown in FIG. 18, the method includes:

1801. receiving a service request for requesting to carry out a service, wherein the service request comprises service deployment information for requesting to deploy a first service and service flow identification information for identifying a first packet flow;

1802. identifying the first packet flow from received packet flow according to the service flow identification information; and

1803. operating, according to the service deployment information, an operation file necessary for deploying the first service, so as to deploy the first service, and performing processing of the first service on the identified first packet flow after the first service is deployed.

In an optional implementation manner, before the performing processing of the first service on the identified first packet flow, the method further includes:

adding a service chain identifier to the first packet flow. The service chain identifier is used for indicating multiple service processings that belong to the first service and are performed on the first packet flow and indicating a sequence of performing the multiple service processings.

Based on the above, step 1803, namely, operating, according to the service deployment information, an operation file necessary for deploying the first service, so as to deploy the first service, and performing processing of the first service on the identified first packet flow after the first service is deployed, includes:

loading and operating multiple service components for deploying the first service, so as to deploy the first service;

determining, according to the service chain identifier, multiple service processings that belong to the first service and need to be performed on the first packet flow and a sequence of performing the multiple service processings; and performing the multiple service processings on the first packet flow according to the sequence.

Furthermore, optionally, the determining, according to the service chain identifier, multiple service processings that belong to the first service and need to be performed on the first packet flow and the sequence of performing the multiple service processings, includes:

inquiring a service routing table according to the service chain identifier to determine multiple service processing components from the multiple service components and a utilization sequence of the multiple service processing components, wherein the multiple service processing components are service components in the multiple service components that are used for implementing the multiple service processings; and utilizing the multiple service processing components to process the first packet flow according to the utilization sequence of the multiple service processing components.

The method for carrying out a service in the network provided by the embodiment may be implemented by the system for carrying out a service in the network as shown in FIG. 12, but is not limited hereto and may be implemented by other system.

For more flows of carrying out a service by the system for carrying out a service in the network provided by the embodiment of the present invention, please refer to the descriptions in the above-mentioned system embodiment, which will not be described redundantly herein.

The method in the present embodiment provides an open service mode, which allows an operator to deviate from equipment manufacturers and develop a new service functionality, thereby reducing an amount of time required for carrying out a new service functionality and meeting rapid developing needs of OTT applications.

Those of ordinary skill in the art may understand that all or a part of the steps in the above-mentioned method embodiments may be implemented with a program instructing related hardware. The foregoing program may be stored in a computer readable storage medium. When being executed, the program executes the steps in the above-mentioned respective method embodiments. The foregoing storage medium includes a variety of media capable of storing program codes, such as an ROM, an RAM, a magnetic disk, an optical disk or the like.

Finally, it should be noted that the above-mentioned respective embodiments are merely used for illustrating, rather than limiting, the technical solutions of the present invention. Although the present invention has been described in detail with reference to the foregoing embodiments, those of ordinary skill in the art should appreciate that, modifications still may be made to the technical solutions disclosed by the foregoing embodiments, or equivalent substitutions may be made to a part or all of the technical features therein; and these modifications or substitutions do not make the spirit of the corresponding technical solutions depart from the scope of the technical solutions of the respective embodiments of the present invention.

What is claimed is:

1. A control apparatus, comprising a processor and a non-transitory computer-readable medium, the non-transitory computer-readable medium having processor-executable instructions stored thereon, the processor-executable instructions, when executed by the processor, facilitating the following:

receiving a service request, wherein the service request comprises service deployment information for requesting to deploy a first service, service flow identification information for identifying a first packet flow, and service flow steering information;

sending the service deployment information to a computing apparatus;

sending the service flow identification information and the service flow steering information to an identifying and steering apparatus; and sending a service chain identifier to the identifying and steering apparatus to instruct the identifying and steering apparatus to add the service chain identifier to the first packet flow, wherein the service chain identifier indicates multiple service processings that belong to the first service and are to be performed on the first packet flow and indicates a sequence of performing the multiple service processings.

2. The control apparatus of claim 1, wherein the processor-executable instructions, when executed by the processor, further facilitate:

sending a load command message to the computing apparatus, wherein the load command message comprises the service deployment information; and sending a flow control message to the identifying and steering apparatus, wherein the flow control message comprises the service flow identification information and the service flow steering information.

3. The control apparatus of claim 1, wherein the processor-executable instructions, when executed by the processor, further facilitate:

sending a resource adjustment message to the computing apparatus, wherein the resource adjustment message comprises information of a resource needing to be occupied by an operation file for deploying the first service.

4. The control apparatus of claim 1, wherein the service flow steering information comprises at least one of the following: an internet protocol (IP) address of the computing apparatus, port information of the computing apparatus, and or identification information of an operation file for deploying the first service.

5. The control apparatus of claim 1, wherein the service deployment information comprises address information of an operation file for deploying the first service.

6. The control apparatus of claim 5, wherein the address information of the operation file comprises: path information for accessing the operation file and filename information of the operation file, or uniform resource locator (URL) information directing to the operation file.

7. The control apparatus of claim 1, wherein the service flow identification information comprises at least one of the following:

information on a physical port receiving the first packet flow;

information on a logical port receiving the first packet flow;

uniform resource locator (URL) information accessed by the first packet flow; or information on a source internet protocol (IP) address, a target IP address, a source transmission layer port and a target transmission layer port of the first packet flow.

8. A system for carrying out a service in a network, comprising:

the control apparatus of claim 1;

the computing apparatus; and the identifying and steering apparatus;

wherein the computing apparatus is configured to:

receive the service deployment information from the control apparatus;

operate, according to the service deployment information, an operation file for deploying the first service, so as to deploy the first service;

receive a first packet flow from the identifying and steering apparatus, wherein the first packet flow comprises the service chain identifier;

determine, according to the service chain identifier, multiple service processings that belong to the first service to be performed on the first packet flow and a sequence for performing the multiple service processings; and perform the multiple service processings on the first packet flow according to the sequence; and wherein the identifying and steering apparatus is configured to:

receive the service flow identification information and the service flow steering information from the control apparatus and the service chain identifier;

identify the first packet flow from a received packet flow according to the service flow identification information;

add the service chain identifier to the first packet flow; and steer the first packet flow carrying the service chain identifier to the computing apparatus according to the service flow steering information.

9. A computing apparatus, comprising a processor and a non-transitory computer-readable medium, the non-transitory computer-readable medium having processor-executable instructions stored thereon, the processor-executable instructions, when executed by the processor, facilitating the following:

receiving service deployment information for requesting to deploy a first service from a control apparatus;

operating, according to the service deployment information, an operation file for deploying the first service, so as to deploy the first service;

receiving a first packet flow from an identifying and steering apparatus, wherein the first packet flow comprises a service chain identifier, wherein the service chain identifier indicates multiple service processings that belong to the first service and are to be performed on the first packet flow and indicates a sequence of performing the multiple service processings;

determining, according to the service chain identifier, the multiple service processings that belong to the first service to be performed on the first packet flow and the sequence for performing the multiple service processings; and performing the multiple service processings on the first packet flow according to the sequence.

10. The computing apparatus of claim 9, wherein the processor-executable instructions, when executed by the processor, further facilitate:

loading and operating, according to the service deployment information, multiple service components for deploying the first service, so as to deploy the first service;

querying a service routing table according to the service chain identifier to determine multiple service processing components from the multiple service components and a utilization sequence of the multiple service processing components, wherein the multiple service processing components are service components in the multiple service components that are used for implementing the multiple service processings; and utilizing the multiple service processing components to process the first packet flow according to the utilization sequence of the multiple service processing components.

11. The computing apparatus of claim 10, wherein querying the service routing table to determine the multiple service processing components and the utilization sequence further comprises:

querying, according to the service chain identifier and a first ingress port, a first service routing table entry to determine an egress port reaching a first service processing component, wherein the first ingress port is an ingress port receiving the first packet flow, and the first service processing component is for performing a first service processing in the multiple service processings;

steering the first packet flow to the first service processing component;

receiving the first packet flow subjected to the first service processing;

querying a second service routing table entry according to a second ingress port to determine an egress port reaching a second service processing component, wherein the second ingress port is an ingress port receiving the first packet flow subjected to the first service processing, and the second service processing component is for performing a second service processing in the multiple service processings; and steering the first packet flow subjected to the first service processing to the second service processing component.

12. The computing apparatus of claim 11, wherein querying the second routing table entry further comprises:

querying, according to the service chain identifier and the second ingress port, the second service routing table entry to determine the egress port reaching the second service component.

13. The computing apparatus of claim 9, wherein the processor-executable instructions, when executed by the processor, further facilitate:

receiving a resource adjustment message from the control apparatus, wherein the resource adjustment message comprises information of a resource needing to be occupied by the operation file; and adjusting the resource needing to be occupied by the operation file according to the resource adjustment message.

14. The computing apparatus of claim 9, wherein the service deployment information comprises address information of the operation file.

15. The computing apparatus of claim 9, wherein the computing apparatus is a server device comprising a virtual switch (Vswitch) for determining the multiple service processings and the sequence for performing the multiple service processings.

16. An identifying and steering apparatus, comprising a processor and a non-transitory computer-readable medium, the non-transitory computer-readable medium having processor-executable instructions stored thereon, the processor-executable instructions, when executed by the processor, facilitating the following:

receiving, from a control apparatus, service flow identification information for identifying a first packet flow, service flow steering information, and a service chain identifier, wherein the service chain identifier indicates multiple service processings that belong to a first service and are to be performed on the first packet flow and indicates a sequence of performing the multiple service processings;

identifying the first packet flow from a received packet flow according to the service flow identification information;

adding the service chain identifier to the first packet flow; and steering the first packet flow carrying the service chain identifier to a computing apparatus according to the service flow steering information.

17. The identifying and steering apparatus of claim 16, wherein the service flow steering information comprises at least one of the following: an internet protocol (IP) address of the computing apparatus, port information of the computing apparatus, or identification information of an operation file for deploying the first service.

18. A system for carrying out a service in a network, comprising:
a control apparatus;
a computing apparatus; and
an identifying apparatus;
wherein the control apparatus is configured to receive a service request, the service request comprising service deployment information for requesting to deploy a first service and service flow identification information for identifying a first packet flow;
wherein the identifying apparatus is configured to identify the first packet flow from a received packet flow according to the service flow identification information, and add a service chain identifier to the first packet flow, wherein the service chain identifier indicates multiple service processings that belong to the first service and are to be performed on the first packet flow and indicates a sequence of performing the multiple service processings; and
wherein the computing apparatus is configured to:
load and operate multiple service components for deploying the first service, so as to deploy the first service;
determine, according to the service chain identifier, the multiple service processings that belong to the first service and are to be performed on the first packet flow and the sequence for performing the multiple service processings; and
perform the multiple service processings on the first packet flow according to the sequence.

19. The system of claim 18, wherein determining the multiple service processings and the sequence further comprises:
querying a service routing table according to the service chain identifier to determine multiple service processing components from the multiple service components and a utilization sequence of the multiple service processing components, wherein the multiple service processing components are service components in the multiple service components that are for implementing the multiple service processings; and
utilizing the multiple service processing components to process the first packet flow according to the utilization sequence of the multiple service processing components.

20. A method for carrying out a service in a network, comprising:
receiving, by a control apparatus, a service request, wherein the service request comprises service deployment information for requesting to deploy a first service, service flow identification information for identifying a first packet flow, and service flow steering information;

sending, by the control apparatus, the service deployment information to a computing apparatus; and sending, by the control apparatus, the service flow identification information and the service flow steering information to an identifying and steering apparatus; and sending, by the control apparatus, a service chain identifier to the identifying and steering apparatus to instruct the identifying and steering apparatus to add the service chain identifier to the first packet flow, wherein the service chain identifier is used for indicating multiple service processings that belong to the first service and are to be performed on the first packet flow and for indicating a sequence of performing the multiple service processings.

21. The method of claim 20, wherein sending the service deployment information to the computing apparatus further comprises: sending a load command message to the computing apparatus, wherein the load command message comprises the service deployment information; and
wherein sending the service flow identification information and the service flow steering information to the identifying and steering apparatus further comprises: sending a flow control message to the identifying and steering apparatus, wherein the flow control message comprises the service flow identification information and the service flow steering information.

22. The method of claim 20, further comprising:
sending a resource adjustment message to the computing apparatus, wherein the resource adjustment message comprises information of a resource needing to be occupied by an operation file for deploying the first service.

23. The method of claim 20, wherein the service flow steering information comprises at least one of the following: an internet protocol (IP) address of the computing apparatus, port information of the computing apparatus, or identification information of an operation file for deploying the first service.

24. The method of claim 20, wherein the service deployment information comprises address information of an operation file for deploying the first service.

25. The method of claim 24, wherein the address information of the operation file comprises: path information for accessing the operation file and filename information of the operation file, or uniform resource locator (URL) information directing to the operation file.

26. The method of claim 20, wherein the service flow identification information comprises at least one of the following:
information on a physical port receiving the first packet flow;
information on a logical port receiving the first packet flow;
uniform resource locator (URL) information accessed by the first packet flow; or
information on a source internet protocol (IP) address, a target IP address, a source transmission layer port and a target transmission layer port of the first packet flow.

27. A method for carrying out a service in a network, comprising:
receiving, by a computing apparatus, service deployment information for requesting to deploy a first service;

operating, by the computing apparatus, according to the service deployment information, an operation file for deploying the first service, so as to deploy the first service;

receiving, by the computing apparatus, a first packet flow, wherein the first packet flow comprises a service chain identifier, wherein the service chain identifier is used for indicating multiple service processings that belong to the first service and are to be performed on the first packet flow and indicating a sequence of performing the multiple service processings;

determining, by the computing apparatus, according to the service chain identifier, the multiple service processings that belong to the first service and are to be performed on the first packet flow and the sequence for performing the multiple service processings; and performing, by the computing apparatus, the multiple service processings on the first packet flow according to the sequence.

28. The method of claim 27, wherein operating the operation file further comprises: loading and operating, according to the service deployment information, multiple service components for deploying the first service, so as to deploy the first service;

wherein determining the multiple service processings and the sequence further comprises: querying a service routing table according to the service chain identifier to determine multiple service processing components from the multiple service components and a utilization sequence of the multiple service processing components, the multiple service processing components being service components in the multiple service components that are used for implementing the multiple service processings; and wherein performing the multiple service processings further comprises: utilizing the multiple service processing components to process the first packet flow according to the utilization sequence of the multiple service processing components.

29. The method of claim 28, wherein querying the service routing table to determine the multiple service processing components and the utilization sequence further comprises:

querying, according to the service chain identifier and a first ingress port, a first service routing table entry to determine an egress port reaching a first service processing component, wherein the first ingress port is an ingress port receiving the first packet flow, and the first service processing component is used for performing a first service processing in the multiple service processings;

steering the first packet flow to the first service processing component;

receiving the first packet flow subjected to the first service processing;

querying a second service routing table entry according to a second ingress port to determine an egress port reaching a second service processing component, wherein the second ingress port is an ingress port receiving the first packet flow subjected to the first service processing, and the second service processing component is used for performing a second service processing in the multiple service processings; and steering the first packet flow subjected to the first service processing to the second service processing component.

30. The method of claim 29, wherein querying the second service routing table entry to determine the egress port reaching the second service processing component further comprises:

querying, according to the service chain identifier and the second ingress port, the second service routing table entry to determine the egress port reaching the second service component.

31. The method of claim 27, further comprising:

receiving a resource adjustment message, wherein the resource adjustment message comprises information of a resource needing to be occupied by the operation file; and adjusting the resource needing to be occupied by the operation file according to the resource adjustment message.

32. The method of claim 27, wherein the service deployment information comprises address information of the operation file.

33. A method for carrying out a service in a network, comprising:

receiving, by an identifying and steering apparatus, service flow identification information for identifying a first packet flow, service flow steering information, and a service chain identifier, wherein the service chain identifier is used for indicating multiple service processings that belong to a first service and are to be performed on the first packet flow and for indicating a sequence of performing the multiple service processings;

identifying, by the identifying and steering apparatus, the first packet flow from a received packet flow according to the service flow identification information;

adding, by the identifying and steering apparatus, the service chain identifier to the first packet flow; and steering, by the identifying and steering apparatus, the first packet flow carrying the service chain identifier to a computing apparatus according to the service flow steering information.

34. The method of claim 33, wherein the service flow steering information comprises at least one of the following: an internet protocol (IP) address of the computing apparatus, port information of the computing apparatus, or identification information of an operation file for deploying the first service.

* * * * *

UNITED STATES PATENT AND TRADEMARK OFFICE
CERTIFICATE OF CORRECTION

PATENT NO. : 10,554,764 B2
APPLICATION NO. : 14/920599
DATED : February 4, 2020
INVENTOR(S) : Huang et al.

Page 1 of 1

It is certified that error appears in the above-identified patent and that said Letters Patent is hereby corrected as shown below:

In the Claims

Claim 4, Column 42, Lines 37-38: "port information of the computing apparatus, and or identification information" should read --port information of the computing apparatus, or identification information--.

Signed and Sealed this
Fourth Day of August, 2020

Andrei Iancu
*Director of the United States Patent and Trademark Office*